US011637597B2

(12) United States Patent
Brown et al.

(10) Patent No.: US 11,637,597 B2
(45) Date of Patent: Apr. 25, 2023

(54) SYSTEM AND METHOD FOR GEOSPATIAL PLANNING OF WIRELESS BACKHAUL LINKS

(71) Applicant: AT&T Intellectual Property I, L.P., Atlanta, GA (US)

(72) Inventors: Philip Brown, Westfield, NJ (US); Krystian Czapiga, Hillsborough, NJ (US); Arun Jotshi, Parsippany, NJ (US); Yaron Kanza, Fair Lawn, NJ (US); Velin Kounev, Weehawken, NJ (US); Poornima Suresh, Piscataway, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/890,361

(22) Filed: Aug. 18, 2022

(65) Prior Publication Data

US 2022/0393723 A1 Dec. 8, 2022

Related U.S. Application Data

(63) Continuation of application No. 17/227,922, filed on Apr. 12, 2021, now Pat. No. 11,528,061.

(51) Int. Cl.

| | |
|---|---|
| ***H04B 7/04*** | (2017.01) |
| ***H04B 7/0426*** | (2017.01) |
| ***H04B 7/06*** | (2006.01) |
| ***H04B 7/08*** | (2006.01) |
| *H01Q 15/02* | (2006.01) |

(52) U.S. Cl.

CPC ........... *H04B 7/043* (2013.01); *H04B 7/0608* (2013.01); *H04B 7/0802* (2013.01); *H01Q 15/02* (2013.01)

(58) Field of Classification Search

CPC .... H04B 7/043; H04B 7/0608; H04B 7/0802; H01Q 15/02

See application file for complete search history.

(56) References Cited

U.S. PATENT DOCUMENTS

| | | | | |
|---|---|---|---|---|
| 2016/0014613 | A1 * | 1/2016 | Ponnampalam | .... H04L 41/0823 370/254 |
| 2017/0012698 | A1 * | 1/2017 | Laufer | ................. H04B 17/318 |
| 2019/0102493 | A1 * | 4/2019 | Harrison | ............... H04W 16/22 |

OTHER PUBLICATIONS

Agiwal, Mamta et al., "Next Generation 5G Wireless Networks: A Comprehensive Survey", IEEE Communications Surveys & Tutorials, vol. 18, No. 3, Third Quarter 2016, 39 pages.

(Continued)

*Primary Examiner* — Nader Bolourchi

(74) *Attorney, Agent, or Firm* — Guntin & Gust, PLC; Ralph Trementozzi

(57) ABSTRACT

Aspects of the subject disclosure may include, for example, calculating a Fresnel zone about a line of sight (LoS) between a pair of antennas positioned on antenna mounts. The Fresnel zone is projected onto a geospatial grid of 3D cells, each having a height above a horizontal plane. Cells that intersect the Fresnel zone projection are selected to obtain a subset cells with constraint heights determined according to heights of the subset cells that are adjusted according to the Fresnel zone. The LoS is revised according to an algorithm to obtain a set of updated LoS. Those updated LoS that do not intersect the set of adjusted constraint heights are identified as solutions that include an optimal solution, should one exist. Other embodiments are disclosed.

20 Claims, 13 Drawing Sheets

(56) References Cited

OTHER PUBLICATIONS

Amaldi, Edoardo et al., "Optimization Models and Methods for Planning Wireless Mesh Networks", Computer Networks, Aug. 2008, 14 pages.
Anderson, H. R., "Optimizing Microcell Base Station Locations Using Simulated Annealing Techniques", Vehicular Technology Conference 1994 (VTC 1994—Spring), vol. 2, pp. 858-862, IEEE, https://doi.org/10.1109/VETEC.1994.345212, 1994, 6 pages.
Ben-Shimol, Yehuda et al., "Automated antenna positioning algorithms for wireless fixed-access networks", Journal of Heuristics, May 2007, 13 pages.
Brown, Philip E. et al., "Height and Facet Extraction from LiDAR Point Cloud for Automatic Creation of 3D Building Models", SIGSPATIAL '19, DOI: 10.1145/3347146.3359372, 2019, 5 pages.
Brown, Philip E. et al., "Interactive Testing of Line-of-Sight and Fresnel Zone Clearance for Planning Microwave Backhaul Links and 5G Networks", SIGSPATIAL'20, DOI: 10.1145/3397536.3422332, 2020, 5 pages.
Brown, Philip E. et al., "Large-Scale Geospatial Planning of Wireless Backhaul Links", SIGSPATIAL '20, DOI: 10.1145/3397536.3422256, 2020, 4 pages.
Calegari, Patrice et al., "Combinatorial optimization algorithms for radio network planning", Theoretical Computer Science 263 (2001) 235-245, Accepted Apr. 2000, 11 pages.
Cohen-Or, Daniel et al., "Visibility and Dead-Zones in Digital Terrain Maps", 12 pages.
Coldrey, M. et al., "Small-Cell Wireless Backhauling", A Non-Line-of-Sight Approach for Point-to-Point Microwave Links; IEEE Vehicular Technology Conference (VTC Fall), 2012, 5 pages.
Dasu, Tamraparni, "Geofences in the Sky: Herding Drones with Blockchains and 5G", Proceedings of 26th ACM SIGSPATIAL International Conference on Advances in Geographic Information Systems, Seattle, WA, USA, Nov. 6-8, 2018, 4 pages.
De Floriani, Leila et al., "Line-of-Sight Communication on Terrain Models", Geographical Information Systems, Jul. 1994, 15 pages.
De Floriani, Leila et al., "Representing the Visibility Structure of a Polyhedral Terrein Through a Horizon Map", Geographical Information Systems, Jul. 1996, 30 pages.
De Floriani, Leila et al., "Visibility Algorithms on Triangulated Digital Terrain Models", Geographical Information Systems, Jan. 1994, 34 pages.
Dvir, Amit et al., "Automated Antenna Positioning for Wireless Networks", 2006, 5 pages.
Franklin, WM R., "Siting Observers on Terrain", Rensselaer Polytechnic Institute, Troy, New York, Mar. 18, 2002, 11 pages.
Hsiung, Teyu et al., "SimCT: Spatial Simulation of Urban Evolution to Test Resilience of 5G Cellular Networks", GeoSim, Nov. 5, 2019, 9 pages.
Jamkhedkar, Pramod et al., "A Graph Database for a Virtualized Network Infrastructure", Conference, Jan.-Feb. 2010, 12 pages.
Jamkhedkar, Pramod A. et al., "Virtualized Network Service Topology Exploration Using Nepal", Conference Paper, SIGMOD'17, May 14-19, 2017, 5 pages.
Johnson, Theodore et al., "Nepal: A Path Query Language for Communication Networks", NDA'16, Jun. 26-Jul. 1, 2016, 9 pages.
Lee, Jay, "Analyses of visibility sites on topographic surfaces", Int. J. Geographical Information Systems, vol. 5, No. 4, pp. 413-429, 1991, 17 pages.
Li, Yongcheng et al., "Microwave Backhaul Topology Planning for Wireless Access Networks", 2014 IEEE, ICTON, 2014, 4 pages.
Luna, Francisco et al., "Evolutionary Algorithms for Solving the Automatic Cell Planning Problem: A Survey", Engineering Optimization, Taylor & Francis, 2010, 42 (07), pp. 671-690., 2010, 26 pages.
Sen, Sayandeep et al., "Long Distance Wireless Mesh Network Planning: Problem Formulation and Solution", WWW 2007 / Track Technology for Developing Regions, Banff, Alberta, Canada, May 8-12, 2007, 10 pages.

* cited by examiner

200

265

230

235

215

210

220

216

240

245

250

255

260

225

220

228

280

300

600

SYSTEM AND METHOD FOR GEOSPATIAL PLANNING OF WIRELESS BACKHAUL LINKS

CROSS REFERENCE TO RELATED APPLICATIONS

This application is a continuation of U.S. patent application Ser. No. 17/227,922 filed on Apr. 12, 2021. All sections of the aforementioned application(s) and/or patent(s) are incorporated herein by reference in their entirety.

FIELD OF THE DISCLOSURE

The subject disclosure relates to a system and method for geospatial planning of wireless backhaul links.

BACKGROUND

Telecommunication networks are facing a rapidly growing demand for network services. Internet applications like live broadcast, teleconferencing and streaming media are increasing the load on network infrastructures, which leads to a continuous requirement for network upgrades. For example, the deployment of 5G is expected to accelerate this process by further increasing the traffic rate of cellular networks. To cope with that, new cellular towers are connected to the network and new 5G antennas are deployed.

A backhaul network or link of a telecommunication network typically consists of Fiber-optic links between towers, but the deployment of optical fibers is slow and expensive, especially when trying to connect remote or isolated geographical places. Hence, fiber-optic links are often replaced by wireless links, such as microwave and/or free space optical transmissions between antennas located on network towers. Due to their high frequencies, microwave and/or free-space optical transmission may be formed as a narrow beam without interfering with other transmissions. Furthermore, waves in the high-frequency band of the electromagnetic spectrum, including microwaves and millimeter waves, carry much more information than low-frequency transmissions, but they are easily blocked by obstacles like buildings, foliage, and the terrain. When planning the network and positioning towers, antennas and transceivers, each connected pair of transmitter and receiver should have a line of sight (LoS) between them, and preferably without any obstruction within a first Fresnel zone about the LoS.

BRIEF DESCRIPTION OF THE DRAWINGS

Reference will now be made to the accompanying drawings, which are not necessarily drawn to scale, and wherein.

DETAILED DESCRIPTION

Figure 1:
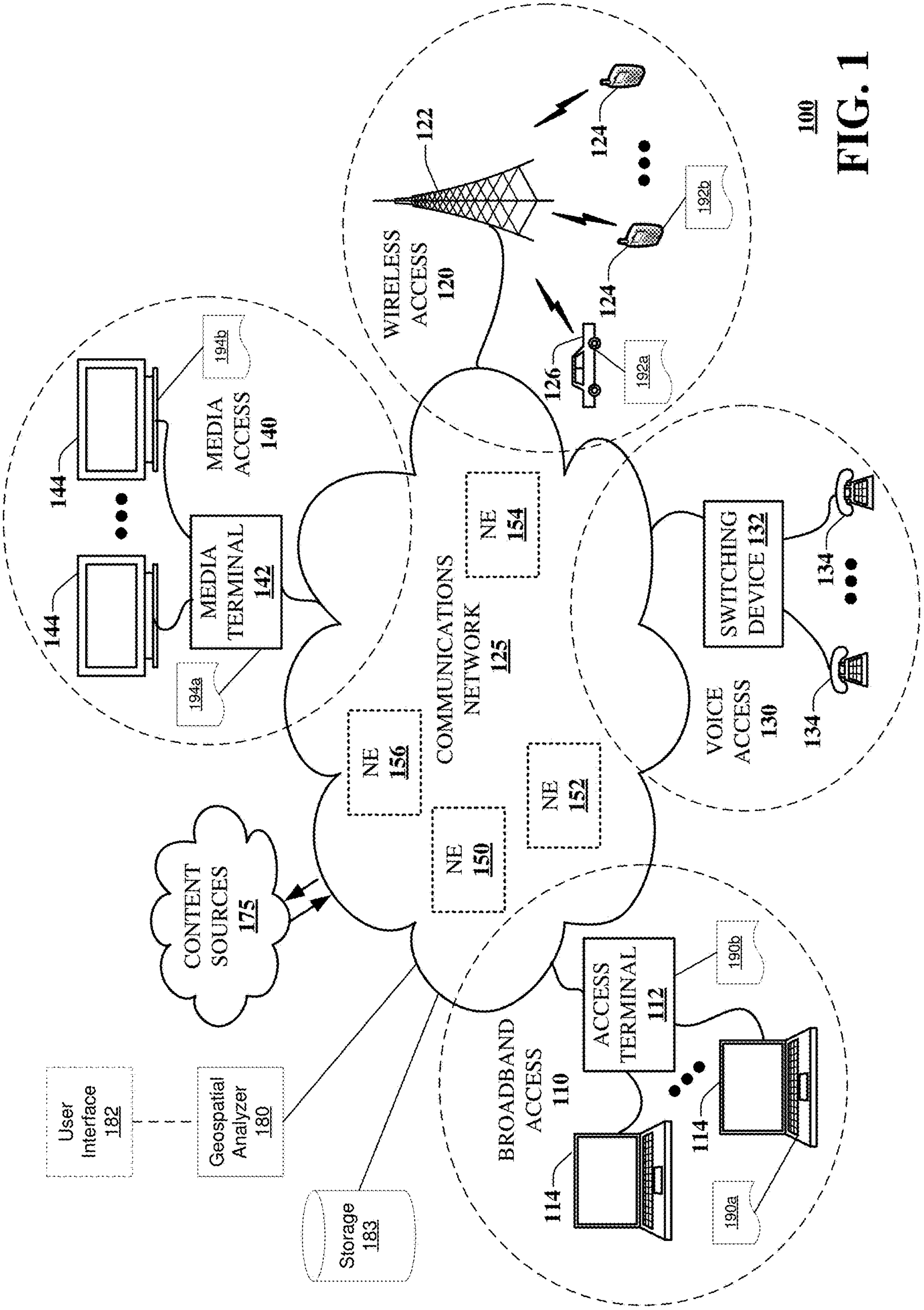
FIG. 1 is a block diagram illustrating an exemplary, non-limiting embodiment of a communications network in accordance with various aspects described herein.

The subject disclosure describes, among other things, illustrative embodiments for systems and methods adapted for efficiently computing antenna heights for wireless communication links while maintaining clearance of at least a first Fresnel zone to identify solutions that optimize antenna heights. Other embodiments are described in the subject disclosure.

One or more aspects of the subject disclosure include a device, including a processing system having a processor and a memory that stores executable instructions. The instructions, when executed by the processing system, facilitate performance of operations. The operations include identifying a line-of-sight (LoS) between first and second antennas, wherein the first and second antennas are positioned within first and second height regions upon first and second towers at first and second geospatial locations. A Fresnel zone is calculated about the LoS and projected onto a geospatial grid to obtain a Fresnel zone projection. The geospatial grid comprises three-dimensional (3D) cells, each 3D cell having a base area within in horizontal plane and a height above the horizontal plane, and wherein the first and second antennas mounted upon the horizontal plane. A subset of the 3D cells are determined as those cells of the geospatial grid intersecting a projection of the Fresnel zone upon the horizontal plane. A set of constraints is generated according to the Fresnel zone projection, wherein the constraints comprise a set of constraint heights obtained from the subset of the 3D cells within a vertical plane containing the first and second towers. The set of constraint heights are adjusted according to the Fresnel zone to obtain a set of adjusted constraint heights within the vertical plane containing the first and second towers. The LoS is updated according to an LoS adjustment strategy to obtain a set of updated LoS. The operations further include identifying a subset of LoS of the set of updated LoS that do not intersect the set of adjusted constraint heights, wherein the subset of the LoS comprises an optimal solution, should one exist.

One or more aspects of the subject disclosure include a process that identifies, by a processing system including a processor, a line between first and second antennas, wherein the first and second antennas are positioned within first and second height regions upon first and second towers at first and second geospatial locations. The process further includes calculating, by the processing system, a Fresnel zone about the line and projecting, by the processing system, the Fresnel zone onto a geospatial grid to obtain a Fresnel zone projection. The geospatial grid includes three-dimensional (3D) cells, each 3D cell having a height above a horizontal plane, wherein the first and second antennas are mounted upon towers extending vertically upward from the horizontal plane. The process further includes selecting, by the processing system, cells of the geo spatial grid that intersect a projection of the Fresnel zone upon the horizontal plane to obtain a subset of the 3D cells and determining, by the processing system, a set of constraint heights according to heights of the subset of the 3D cells, the set of constraint heights located within a vertical plane containing the first and second towers. The set of constraint heights are adjusted, by the processing system, according to the Fresnel zone to obtain a set of adjusted constraint heights within the vertical plane containing the first and second towers. The LoS is adjusted according to an LoS adjustment criterion to obtain a set of updated LoS. The process further includes identifying, by the processing system, a subset of LoS of the set of updated LoS that do not intersect the set of adjusted constraint heights, wherein the subset of the LoS comprises an optimal solution, should one exist.

One or more aspects of the subject disclosure include a non-transitory, machine-readable medium, including executable instructions that, when executed by a processing system including a processor, facilitate performance of operations. The operations include calculating a Fresnel zone about a line between first and second antennas, wherein the first and second antennas are positioned within first and second height regions upon first and second antenna mounts at first and second geospatial locations. The Fresnel zone is projected onto a geospatial grid to obtain a Fresnel zone projection, wherein the geospatial grid comprises three-dimensional (3D) bins or cells, each 3D cell having a height above a horizontal plane, and wherein the first and second antennas are mounted upon towers extending vertically upward from the horizontal plane. Cells of the geospatial grid that intersect a projection of the Fresnel zone upon the horizontal plane are selected to obtain a subset of the 3D cells, and a set of constraint heights are determined according to heights of the subset of the 3D cells, the set of constraint heights located within a vertical plane containing the first and second antenna mounts. The set of constraint heights are adjusted according to the Fresnel zone to obtain a set of adjusted constraint heights within the vertical plane containing the first and second antenna mounts. The LoS is varied according to an LoS adjustment algorithm to obtain a set of updated LoS. A subset of LoS of the set of updated LoS are identified that do not intersect the set of adjusted constraint heights, wherein the subset of the LoS comprises an optimal solution, should one exist. In at least some embodiments, testing includes determining whether at least a first 3D Fresnel zone defined about the LoS is intersected by any of the 3D cells, such that the optimal solutions may also be free from any obstructions within at least the first 3D Fresnel zone.

Planning and optimization of radio networks has been studied in many papers. Planning the topology of networks has been investigated for cellular networks, long-range WiFi, and microwave links. Deployment of microwave links for non-line-of-sight cases has also been explored. Various data management tools were developed for managing and querying the topology of communication networks. However, while the focus of these papers is on planning the network topology, or querying it, they do not show how to effectively test the viability of a wireless link between towers, from a geospatial perspective, how to manage the geospatial data, and how to apply such tests at a large scale, e.g., testing that the LoS between a receiver-transmitter pair is not obstructed, while considering Fresnel zones.

Others have studied the selection of locations for antennas and microcells in cellular networks, by focusing on a theoretical optimization problem of how to create an optimal cellular network while satisfying graph properties like connectivity. For example, Ben-Shimol et al. studied the CMBS (Connecting Multiple fixed access Base Stations) problem: Given a terrain and a set of base stations, connect all the base stations in that set by positioning the smallest possible set of relay stations while considering the terrain properties. CMBS and other positioning problems are NP-hard. CMBS is also MAX-SNP-hard so there is no approximation algorithm for it. Thus, these papers at best present heuristics for the antenna-positioning problem, e.g., heuristics for the Steiner Tree Problem by computing a Minimal Spanning Tree.

These approaches, however, focus on a creation of the topology for wireless networks and not on large-scale LoS computation and they do not show how to compute optimal antenna heights for a pair of antennas. Computing visibility between given objects by testing LoS has received attention over the years, e.g., studying LoS over raster Digital Terrain Model (DEM) and topological surfaces. For example, Franklin and Ray studied visibility methods over a raster terrain. De Floriani and Magillo showed how to compute different types of LoS for points, lines, and regions. De Floriani et al. studied a problem very related to the one we are studying—positioning transceivers based on visibility; however, their study does not show how to handle Fresnel zones or how to compute optimal heights for receivers and transmitters.

The systems, processes and machine-readable instructions disclosed herein present a solution to large-scale wireless link planning, by exploiting geospatial data management methods. Namely, the disclosed techniques address efficient computation of optimal heights for the antennas. The disclosed techniques include computations that consider clearance of two-dimensional (2D) and/or three-dimensional (3D) Fresnel zones. Further, the disclosed techniques may be executed over a large-scale geospatial database. Results have been obtained for and tested over an entire area of continental USA. The disclosed techniques further address management of geospatial data by combining a database management system with the disclosed algorithms.

Microwave backhaul links are often used as wireless connections between telecommunication towers, and particularly in places where deploying optical fibers is impossible or too expensive. The relatively high frequency of microwaves increases their ability to transfer information at a high rate, but it also makes them susceptible to obstructions and interference. Hence, when deploying wireless links, there are two conflicting considerations. First, the antennas height, selected from the available slots on each tower, should be as low as possible. Second, there should be a line of sight (LoS) between the antennas, and a buffer around the LoS defined by a first Fresnel zone should be clear of obstacles. The LoS can be represented by a straight line between the two ends of a backhaul link. The line is straight but extends over a curved earth that may include terrain elevation variations and/or other potential obstructions, such as buildings, trees, billboards, bridges, and the like. Thus, a planning system for wireless links may include managing geospatial information regarding elevation and obstacles between the towers, and executing Fresnel-zone clearance tests, e.g., over a 3D model of a deployment area.

Disclosed herein are examples of systems, processes and non-transitory machine-readable instructions adapted for computing height of antennas by testing LoS and clearance of Fresnel zones. The systems, processes and/or software are adapted to process enormous geographic regions, e.g., covering all of the USA, at significant distances between towers, e.g., up to 80 kilometers or more. In at least some applications, application of the disclosed techniques may produce results within a few minutes for up to thousands of pairs of antennas, e.g., in a batch mode operation. The disclosed techniques provide efficient computation of antenna heights that permit effective modeling and management of large-scale geospatial data as would be necessary for network operation, maintenance, and planning, under real-world conditions.

Figure 2A:
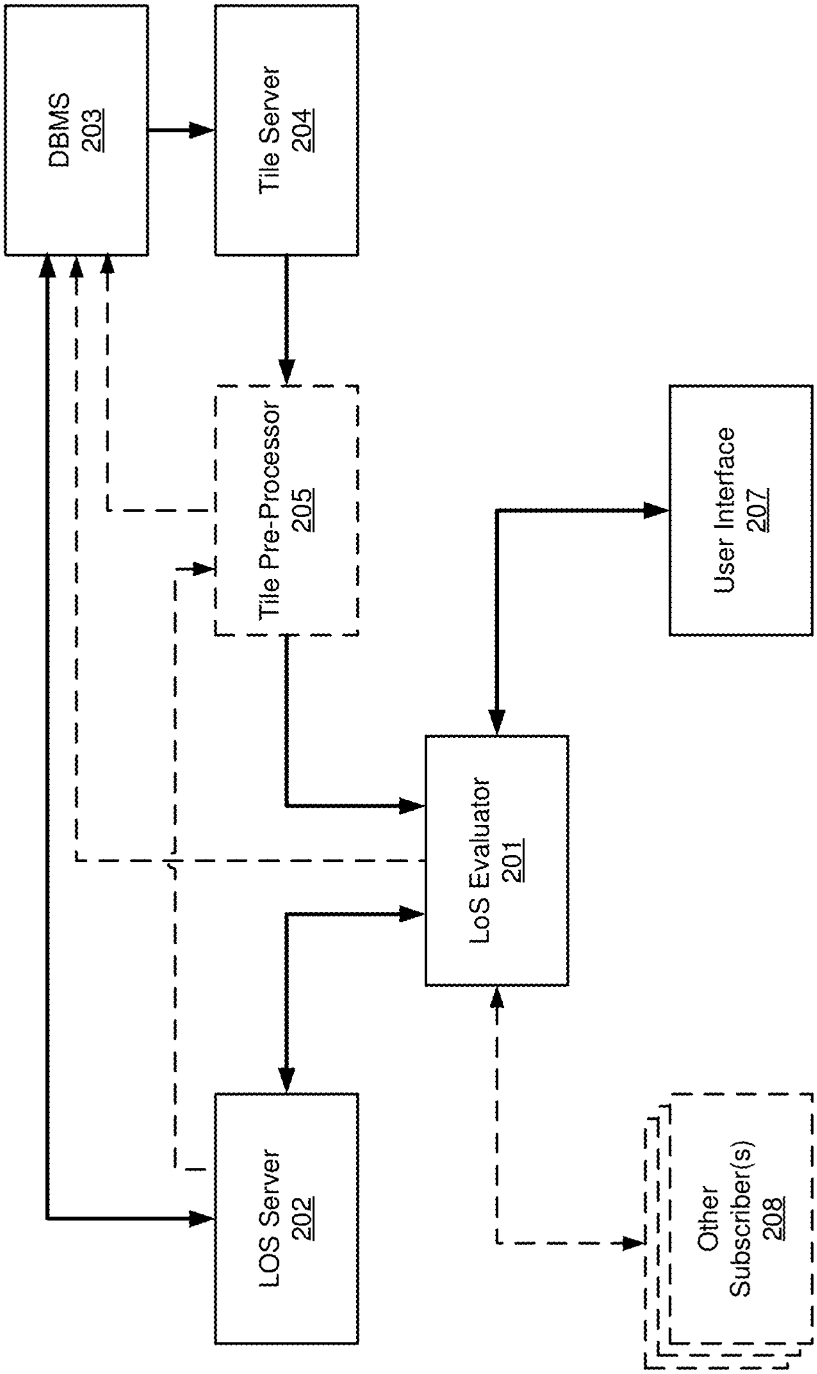
FIG. 2A is a block diagram illustrating an example, non-limiting embodiment of an LoS analysis system functioning within the communication network of FIG. 1 in accordance with various aspects described herein.
Figure 2B:
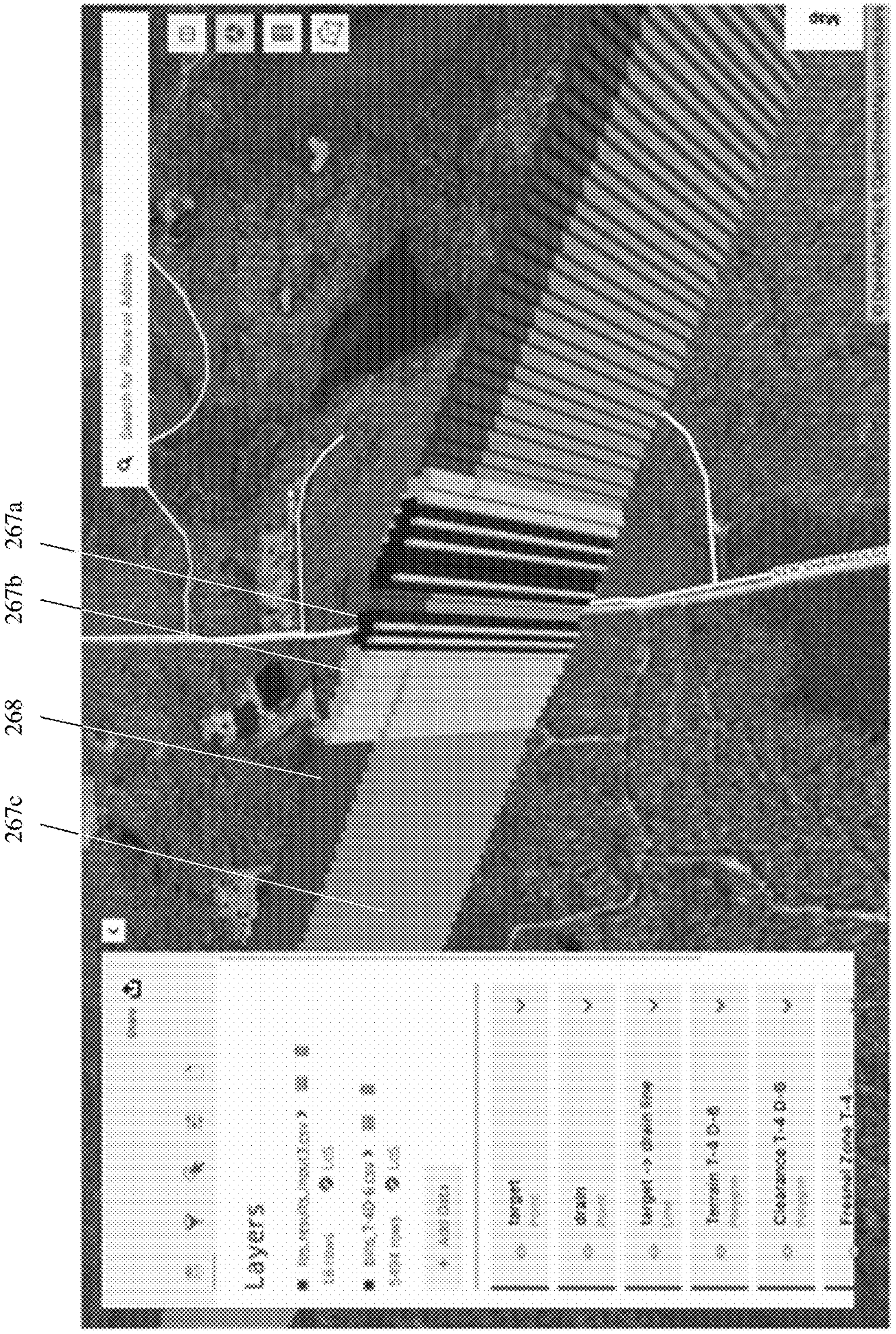
FIG. 2B is an illustration of an example, non-limiting embodiment of graphical analysis output provided by the LoS system functioning within the communication network of FIG. 1 in accordance with various aspects described herein.
Figure 2C:
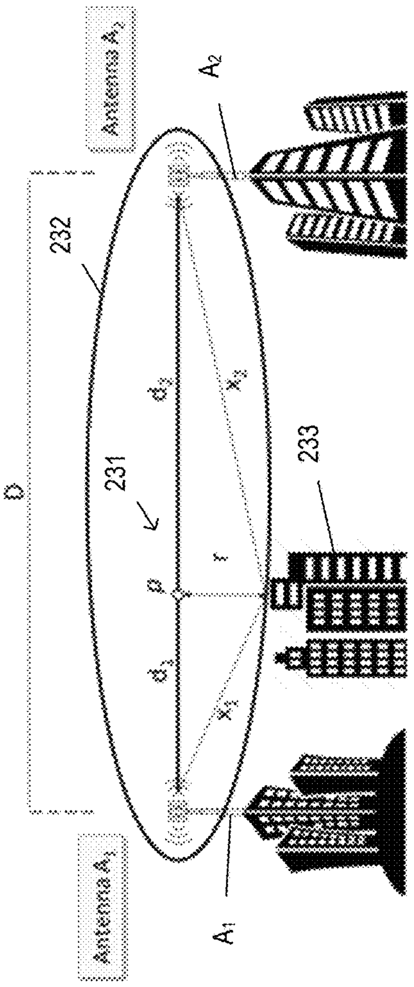
FIG. 2C is a schematic diagram illustrating an example, non-limiting embodiment of an LoS link, including a two-dimensional (2D) Fresnel zone processed according to the LoS analysis system functioning within the communication network of FIG. 1 in accordance with various aspects described herein.
Figure 2D:
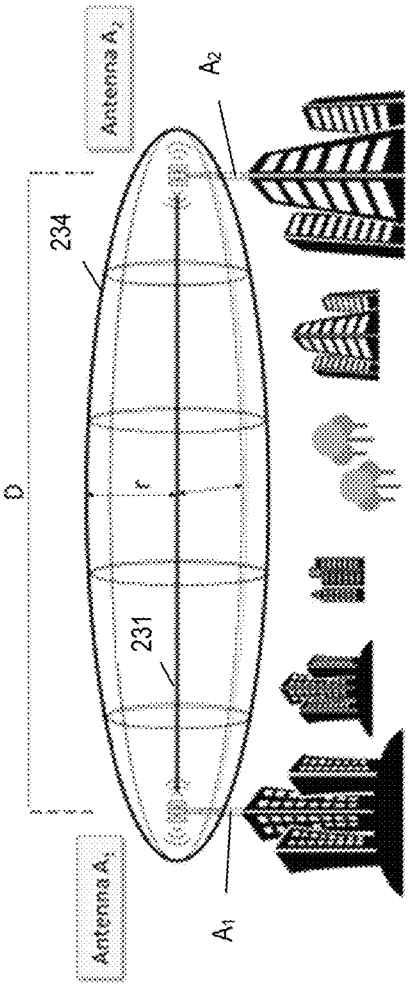
FIG. 2D is a schematic diagram illustrating an example, non-limiting embodiment of an LoS link, including a three-dimensional (3D) Fresnel zone processed according to the LoS analysis system functioning within the communication network of FIG. 1 in accordance with various aspects described herein.

Given two antennas, a Fresnel zone is a buffer shaped as a prolate spheroid around the LoS, as illustrated in FIG. 2D. Its radius changes as a function of the distance from the antennas and the frequency of the transmission. It is maximal at the center point—the point that is equidistant from both antennas—and gets smaller while moving away from the center point. When deploying a transmitter-receiver pair, or two transceivers, at least a first Fresnel zone around the LoS must be clear of obstructions.

Many considerations are involved in the planning of the network and the deployment of the wireless links between towers, including tower locations, available space on the towers, tower-height limits, transmission frequencies and geospatial obstructions in the area. Without proper tools, network engineers must visit potential tower locations and examine manually if a deployment is possible in that location. Any process that relies on site visits is expensive, slow and does not scale. The techniques disclosed herein offer assistance to network planners by reducing a need for field visits.

Given a pair of towers that should be linked, a planning system computes heights for antennas on those towers. Planning antenna heights includes a balancing two conflicting goals. On the one hand, it is impossible to install all the antennas at the highest slot, so the goal is to position antennas as low as possible, to reduce installation and maintenance costs. On the other hand, for each transmitter-receiver pair, their height should guarantee LoS and clearance of the Fresnel zone around the LoS. Note that the antenna height is restricted by the tower height and that there is often a tradeoff—a higher height on one tower might allow lowering the height on the other tower, while maintaining LoS, and vice versa. Hence, an optimal (or effective) deployment may be defined, and corresponding antenna heights computed accordingly.

Application of the techniques disclosed herein to the planning of backhaul links offers numerous contributions. For example, the techniques include novel methods for testing LoS and Fresnel zone clearance for towers that are far from one another. Alternatively or in addition, novel algorithms are introduced for computing optimal antenna heights for pairs of towers. (3) The techniques may be embodied in a system for planning wireless backhaul links, that demonstrate effective management of the geospatial data for supporting large-scale planning. In particular, the disclosed techniques address the challenges involved in implementing a planning systems that are capable of efficiently testing LoS for distances of 80 kilometers (50 miles) or more, over a real-world elevation model of a substantial geographic region, such as an entire country, e.g., the entire continental USA.

Referring now to FIG. 1, a block diagram is shown illustrating an example, non-limiting embodiment of a system 100 in accordance with various aspects described herein. For example, system 100 can facilitate in whole or in part efficient testing LoS links for clearance of Fresnel zones to identify solutions that optimize antenna heights. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the communication system 100 includes a geospatial analyzer 180 adapted to analyze LoS backhaul links according to the techniques disclosed herein based on antenna tower locations, antenna height ranges and geospatial data. The communication system may include a geospatial data storage system 183, such as a database management system. The geospatial data storage system 183 may store geospatial data including one or more of terrain elevations, descriptive and/or heights of natural and/or artificial structures overlaying a geospatial grid. The geospatial data storage system 183 may store antenna mounting structure location, such as tower locations, types, heights, owners, and information regarding other antennas as may already be installed on the towers. In at least some embodiments, the communication system 100 may include a user interface 182 adapted to facilitate user interaction with the geospatial analyzer, e.g., accepting user input identifying backhaul links, such as endpoints, intermediate points, tower locations, frequency bands of operation, and the like. The user interface 182 may include a graphical interface portion adapted to display graphical information, such as maps, tower locations, LoS links, Fresnel zones, 3D grid information, and analysis results.

One or more of the broadband access terminal 112 or the data terminals 114, may include a Geospatial analyzer client 190*a*, 190*b*, adapted to facilitate LoS link analysis in cooperation with the geospatial analyzer 180 according to a client-server architecture. Likewise, one or more of the media terminal 142 or the display devices 144, e.g., smart display devices, may include a Geospatial analyzer client 194*a*, 194*b*, adapted to facilitate LoS link analysis in cooperation with the geospatial analyzer 180 according to a client-server architecture. In at least some embodiments, one or more of the media mobile devices 124, including smart devices, e.g., according to an Internet of Things, or vehicles 126, e.g., may include a Geospatial analyzer client 192*a*, 192*b*, adapted to facilitate LoS link analysis in cooperation with the geospatial analyzer 180 according to a client-server architecture.

FIG. 2A is a block diagram illustrating an example, non-limiting embodiment of a LoS analyzer system 200 functioning within the communication network 100 of FIG. 1 in accordance with various aspects described herein. The example LoS analyzer system 200 includes an LoS evaluator module 201 adapted to implement one or more algorithms adapted to identify optimal LoS solutions. The LoS analyzer system 200 further includes an LoS server 202, a tile server 204 and in at least some embodiments, a tile preprocessor 205 (shown in phantom). In at least some embodiments, the LoS analyzer system 200 includes a database management system (DBMS) 203 adapted to store and/or serve supporting information, such as geospatial data, terrain maps, elevation data, possibly, analysis results, whether there be a solution or not, possibly including interim results, such as LoS calculations, Fresnel zone calculations, precalculated terrain elevation points and the like. Without limitation, the DBMS 203 may be replaced with any suitable storage system adapted to store and retrieve supporting information, such as a storage device, e.g., a hard disk drive, a flash drive, and the like.

It is envisioned that the LoS analyzer system 200 may include a user interface 207, e.g., a local and/or remote operator console at which a network planner may select input values, such as one or more of definitions of link endpoints, towers, antennas, operating frequencies or wavelengths, data rates, customer identities, and so on. In at least some applications, the operator may select which algorithms to be applied, and/or which order multiple algorithms may be applied, and so on. In at least some embodiments, the LoS analyzer system 200 may be implanted according to a client server module, in which the LoS evaluator hosts a server application servicing client applications, such as the user interface 207 for one or more other subscribers 208.

According to the illustrative embodiment, the DBMS 203 is in communication with the LoS server 202 and the tile server 204. The DBMS 203 may store elevation grids and/or elevation points associated with one or more particular LoS under investigation. In at least some embodiments, the DBMS 203 may be in further communication with one or more of the tile preprocessor 205 and/or the LoS evaluator module 201. To the extent preprocessing is applied, e.g., to combine elevation data with other terrain features, such as vegetation types and/or heights, building locations and/or heights, and the like, the resulting elevation points may be provided to the DBMS 203 to support current analyses and/or future analyses that may involve the same towers and/or operating frequencies or wavelengths. It is envisioned that in at least some embodiment, interim analysis values and/or analysis results, including indications of solutions and/or no-solutions may be provided by the LoS evaluator module 201 for storage at the DBMS 203. In at least some embodiments, stored results may include graphical results, e.g., representations of the 3D terrain grid bins over a map with indications of possible interference and/or clearance for LoS operations of the applicable link.

In at least some embodiments, the DBMS 203 includes a database management system adapted to store geospatial data set used by the LoS server 202 and/or the LoS evaluator and/or by the Tile Server. It is understood that in at least some embodiments, the tile server 204 may include virtually any information retrieval and/or database management system. Examples include, without limitation, MySQL® database management systems, Oracle® database services, SQL® Server, and the like. It should be clear that the selection of PostgreSQL® database management systems. Such database management systems and/or services may be arbitrary in their application, such that selection of any particular one, e.g., for the tile server 204, may be based on business considerations, rather than technical ones. In at least some embodiments, the data may be stored according to a PostgreSQL 12 (see, e.g., https://www.postgresql.org/), with PostGIS for the geospatial functionality (https://postgis.net/). It is understood that geospatial data is relatively static, hence, it may be stored according to an index, such as a clustered index, to promote efficient retrieval of data. For generality, a GiST index is described in the illustrative examples, however, it is understood that any spatial index be used. The example geospatial data uses bins of size 10×10 meters for most areas, and bins of size 1×1 meters for some urban areas, covering all of the USA and having a size of approximately 20 TB.

The tile server 204 may present a map, e.g., by serving Mapbox MBTiles to a client (see https://docs.mapbox.com/help/glossary/mbtiles/). The tiles may be vector tiles. By way of illustrative example, an effective storage and/or retrieval of the MBTiles, the tiles may be managed using the SQLite® downloadable software for creating searchable database to fashion an in-memory database (see, e.g., https://www.sqlite.org/). The tile server 204 may include a service, e.g., written in Rust, that is adapted to serve both as a static and a dynamic tile server model. A static tile server generally serves existing tiles per user request, whereas a dynamic tile server may create tiles on the fly and then serve them as needed. Such a dynamic approach reflects real-time changes in the underlying database. One or more of the tile server 204, the LoS server 202 and the LoS evaluator may be implemented according to multithreaded processing. For example, a multi-threaded LoS evaluator may initially spans up to 50 threads, with this number being increased as needed.

The LoS server 202 may executes one or more backend computations. For example, the LoS server 202 may receive input data from a frontend and perform LoS computations, e.g., publishing results to topics, e.g., according to a publish-subscribe architecture, for frontend components to read and display. In at least some embodiments, the LoS algorithms for fixed-drain height and for min-max may be written in Python. Alternatively or in addition, any of the algorithms for antenna-height computation, such as the algorithm for min-sum, may be implemented in C, e.g., using shared libraries. It is understood that, more generally, any of the algorithms disclosed herein may be implemented in Python, e.g., using a connector module to access the database, in C, or in any other programming language.

The user interface 207, or frontend may include a Web-based client, e.g., using JavaScript libraries for visualization of towers, 3D bins, terrain elevation and Fresnel zones (clearance or obstructions), see FIG. 2B. The frontend may be adapted to display an interactive map, to handle user input and/or to present LoS results. The front end may also communicate LoS data to other devices, such as the LoS evaluator module 201.

One or more of the LoS evaluator module 201 and/or the user interface 207 may be adapted to host a profiler. The profiler may provide a performance monitoring function that listens to published topics in order to measure timing of LoS jobs. The other subscribers 208 (shown in phantom) may include one or more other various applications that can be subscribed to receive information related to the analyses, e.g., messages from a message broker in communication with the LoS evaluator module 201. In at least some embodiments, the LoS evaluator module 201 is adapted to perform a testing function, e.g., executing experiments and/or measuring test results.

The backend component(s) may be deployed on one or more machines. One machine may be adapted to maintains a database, while the other machine is providing a Web server function that may include a module that executes the antenna-height computations (including testing LoS and Fresnel-zone clearance).

Positioning antennas on towers while examining the line of sight between the antennas requires knowledge of any geospatial obstructions that may exist between the towers. Digital surface models (DSM), sometimes referred to as a digital elevation models (DEM) provide elevation data corresponding to terrain. For example, a DSM may provide a height above sea level at different geographical points. Elevation values of the geographical points may be referenced according to their corresponding latitude, longitude pairs. Alternatively or in addition the elevation values may be indexed according to a grid structure that may, in turn, be referenced according to a predetermined reference location, such as a fixed latitude-longitude, a landmark, and/or some other suitable reference. In at least some embodiments, a DSM may be constructed according to a predefined resolution $\alpha$. The grid structure may be rectangular, e.g., having square grid elements with a resolution of $\alpha$=10 meters. Alternatively or in addition, the grid may be any regular polygon, such as triangular, diamond, hexagonal, and so on, and combinations thereof. It is envisioned that, without limitation, the grid elements may be regular shapes of a common size, irregular shapes of the same or similar area size and/or regular or irregular shapes of different sizes. For example, sizes may be determined according to features of a terrain, with relatively uniform terrains defined according to a relatively large grid, whereas varying terrains, e.g., hills, valleys, mountains, vegetation, buildings and so on, defined according to a finer resolution.

According to illustrative examples provided herein, a DSM may be created by a partition of an entire planning area, e.g., a state, group of states, or the entire USA, into bins of size $\alpha \times \alpha$. (In practice, in different areas there could be bins of different size, according to the resolution of the geospatial data.) An elevation or height may be assigned to each bin. In at least some embodiments, the height is determined as a sum of a terrain elevation, e.g., from a DEM, and height above ground of objects, such as buildings, utility poles, bridges, and vegetation, e.g., crops, trees, vegetation. The summations may be carried over a grid of elevation values, such as elevation values over an area of exploration. For example, a terrain grid may be denoted by G, where G={(s, h), . . . } provides a set of pairs of a squared polygonal area s and height h. In at least some instances, a cell s in combinations with its corresponding height h, may be referred to as a 3D bin.

Antennas may be free standing or mounted on a supporting structure. Antenna supporting structures may include, without limitation, antenna masts or towers, utility poles, buildings, natural features, such as hills, and so on. The examples discussed herein refer to towers, but any suitable support structure may be used. A tower T has a corresponding location that may be referenced to a grid. The tower location 1 may be identified as a pair of longitude and latitude coordinates. At least some antenna towers may offer a range of possible antenna mounting locations. T=(l, $h_{min}$, $h_{max}$) and the minimum (maximum) height $h_{min}$ ($h_{max}$) for antennas on this tower. A wireless backhaul link operating at higher frequencies, e.g., microwaves, millimeter waves, or even higher, relies on a line of sight (LoS) between each end of the link. Accordingly, the illustrative examples disclosed herein consider one or more LoS links between pairs of antenna and/or free-space optical towers. A solution may be referred to as a valid pair of antenna heights for both towers, as discussed herein below.

Given a pair of towers, a solution may include a respective antenna height for each tower, such that a direct line between the antennas does not intersect any 3D bin of a terrain grid describing ground heights and/or obstruction heights within a vicinity of the LoS link. It is understood that in at least some embodiments, a solution may include an LoS link having a Fresnel zone determined about the LoS path, such that the Fresnel zone does not intersect any 3D bin. Under certain constraints, a solution may include height of each antennas falling within applicable boundaries [$h_{min}$, $h_{max}$] defined for either or both towers. It is understood that a solution may not be available in view of one or more constraints, such as LoS path length, available tower heights and/or terrain elevations and/or obstructions, e.g., according to an applicable terrain grid G.

A solution for an LoS link between two towers, $T_1$ and $T_2$ may be denoted by sol[$T_1$, $T_2$] ($h_1$, $h_2$), a predicate that returns "True" if the pair ($h_1$, $h_2$) is a solution for the pair of towers $T_1$ and $T_2$. In at least some applications, a notation sol($h_1$, $h_2$) may be used when $T_1$ and $T_2$ are clear from the context.

Depending upon the details of any particular LoS link, there may be some instances in which many solutions are available, and other instances in which no solutions are available. To the extent there is no solution, an LoS analysis system adapted to perform one or more of the analyses disclosed herein may indicate one or more bins of the terrain grid responsible for any LoS limiting obstruction when the antenna heights on both towers are maximal.

Considering a pair of towers constituting ends of an LoS link under investigation, one may be referred to as a drain and the other as target. Typically, the drain is a tower that is already connected to the network and the target is a new tower. Thus, the antenna height on the drain tower is sometimes fixed. Nonetheless, there is still a need to compute the height of the antenna on the target tower.

Consider a pair of drain and target towers, $T_d$ and $T_t$ in correspondence. Several alternative approaches for determining optimal antenna heights are possible, of which three are described in detail herein. It may be appreciated that a goal of a solution, sometimes referred to as an optimal solution, is to install one or both antennas as low as possible. One of the illustrative solutions is referred to herein as a "fixed-drain" solution, in which a height $h_d$ of an antenna on the drain tower is fixed and cannot be changed, whereas a height $h_t$ of an antenna on the target tower may vary within a range. Given the height $h_d$ of the antenna on the drain tower, an optimal fixed-drain solution may include a solution ($h_d$, $h_t$) such that the following condition is satisfied:

$$h_d \leq h', \text{ for any solution } (h_d, h') \tag{1}$$

Another one of the illustrative solutions is referred to herein as "min-max" solution. The min-max solution aims to reduce a height of a higher one of the drain or target antennas, with respect to a lowest available height, e.g., a base of the tower, referred to herein as $h_{min}$. For example, a solution of (40, 110), the numbers referring to a height dimension, such as meters or feet, in this case would be less desired than a solution of (60, 100), because a solution, e.g., an LoS link may be supported in which the higher antenna among the two, i.e., the antenna at 110 meters could be lowered to 100 meters in the second instance.

According to a min-max solution, let $h^d_{min}$ and $h^t_{min}$ be the lowest available elevations, e.g., the base elevations of the drain and target towers, respectively. An optimal min-max solution would be a solution ($h_d$, $h_t$), such that for every solution ($h_d'$, $h_t'$), the following condition is satisfied:

$$\max\{h_d - h^d_{min}, h_t - h^t_{min}\} \leq \max\{h_d' - h^d_{min}, h_t' - h^t_{min}\} \tag{2}$$

Yet another one of the illustrative solutions is referred to herein as "min-sum" solution. In some applications, a total sum of heights may be more important that reducing a maximum height of either antenna. According to a min-sum solution, a solution having drain, target heights (40, 110) would be preferred over a solution having drain, target heights (60, 100), because the sum of heights in the first case is 150, whereas the sum of heights in the second case it is 160. An optimal min-sum solution, may be defined as a solution ($h_d$, $h_t$) that satisfies the following condition for every solution:

$$(h_d', h_t'), h_d + h_t \leq h_t' \tag{3}$$

It is understood that the processes disclosed herein, such as determinations of one or more of the fixed drain, the min-height or the min-sum solutions may be performed for a single link, e.g., a single pair of drain and target towers. Alternatively or in addition, the processed may be applied to multiple links in a simultaneous, concurrent and/or sequential fashion. Evaluations of the various solutions may be referred to as a workload, e.g., having a set of pairs of drain and target with their corresponding height ranges and/or limits. When processing a workload, height may be computed for each given pair of towers, according to one or more different solution types, such as one or more of the fixed drain, the min-height and/or the min-sum solutions.

In an effort to obtain reliable solutions, the processes disclosed herein may be adapted to take Fresnel zones into account in network planning. A consequence of Fresnel zones on shortwave transmissions may include zones of destructive interference between direct and reflected electromagnetic waves, e.g., in high frequency bands of the electromagnetic spectrum. A brief description of Fresnel zones and their computation follows. Consider the antennas depicted in an example LoS link scenario 230 FIG. 2C and an LoS transmission from antenna $A_1$ to antenna $A_2$ having a corresponding wavelength λ. A direct beam 231, going via point p and comprising the segments $d_1$ and $d_2$, with a beam that is redirected from an obstruction, in this example, a building 233, below the direct beam 231. The redirected bean consists of the segments $x_1$ and $x_2$. A shift of half a wavelength between the direct and the redirected beams leads to a destructive interference and a significant reduction in the signal strength. This happens when $x_1+x_2=d_1+d_2+n\cdot\lambda/2$, for any odd integer n. By assigning $(x_i)^2=r^2+(d_i)^2$, for i=1, 2, the following relationship is obtained:

$$\sqrt{(d_1)^2+r^2}+\sqrt{(d_2)^2+r^2}-(d_1+d_2)=n\frac{\lambda}{2}. \tag{4}$$

Note that i refers to an index to exploit the symmetry of the problem. Let $z_i=(r/d_i)^2$, for i=1, 2. Then, $$\sqrt{(d_i)^2+r^2}=d_i\sqrt{1+\left(\frac{r}{d_i}\right)^2}=d_i(1+z_i)^{\frac{1}{2}}. \tag{5}$$

When $r<<d_i$, we get that $z_i\approx 0$. A Taylor series of the function $d_i(1+z_i)^{1/2}$ around 0 yields $di(1+½zi+O(z_i^2))$. By neglecting the $O(z_i^2)$ component of the series, the following relationships are obtained:

$$d_1\left(1+\frac{1}{2}z_1\right)+d_2\left(1+\frac{1}{2}z_2\right)-(d_1+d_2)=n\frac{\lambda}{2}; \tag{6}$$

and $$d_1\left(1+\frac{1}{2}\left(\frac{r}{d_1}\right)^2\right)+d_2\left(1+\frac{1}{2}\left(\frac{r}{d_2}\right)^2\right)-(d_1+d_2)=n\frac{\lambda}{2}. \tag{7}$$

That is, $$\frac{r^2}{2d_1}+\frac{r^2}{2d_2}=n\frac{\lambda}{2},$$

and therefore:

$$r\approx\sqrt{n\lambda\frac{d_1d_2}{(d_1+d_2)}}. \tag{8}$$

The maximum radius occurs when $d_1=d_2$, that is, when the point p occurs at a midpoint of the direct beam 231. An example Fresnel zone 232 obtained according to the foregoing relationships is illustrated about the direct beam 231. The Fresnel zone 232 decreases when getting closer to either one of the antennas $A_1$, $A_2$. Note that the approximation $r/d_i\approx 0$ should not be applied when $d_i$ is very small, e.g., occurring very close to either one of the antennas. When the point p is at one of the antennas, a radius of approximately nλ/2 may be used, perpendicular to the direct beam 231 and a radius of nλ/4 in a direction opposite the second antenna. Symmetry of the function may be appreciated with respect to $d_1$ and $d_2$.

In practice, network engineers may focus primarily on a first Fresnel zone, in which n=1. It is understood, however, that applying the test with other values of n merely requires a change of the parameter and affecting the buffer width.

For a transmission frequency f, the wavelength is λ=c/f, where c≈2.997×108 m/s is the speed of electromagnetic waves in air. For example, consider two antennas located at a distance of D=20 km from each other, and a transmission with frequency f=30 GHz. Then, λ=0.01 meter and the radius of the first Fresnel zone at the midpoint is $\sqrt{0.1\cdot 10{,}000^2/(2\cdot 10{,}000)}\approx 22$ meter.

It is understood that the Fresnel zone exists a three-dimensional (3D) surface. As illustrated in the scenario 235 of FIG. 2D, the Fresnel zone 234 is represented as an ellipsoid drawn about the direct beam 231, with a major axis of the ellipsoid aligned with the LoS direct beam. The Fresnel-zone radius changes according to a distance from either one of the antennas $A_1$, $A_2$. According to an evaluation or testing of a line corresponding to an LoS path between the antennas, given coordinates of a point below the line between the antennas, we need to know the width of the buffer above the point, based on a proper distance computation. Because the computations are on a sphere, we start by computing the angle used in the computation of a great-circle distance (see http://mathworld.wolfram.com/Great-Circle.html), i.e., the angle between vectors from earth center to given points corresponding to locations of pairs of antennas or the ends of LoS paths under investigation.

Figure 2E:
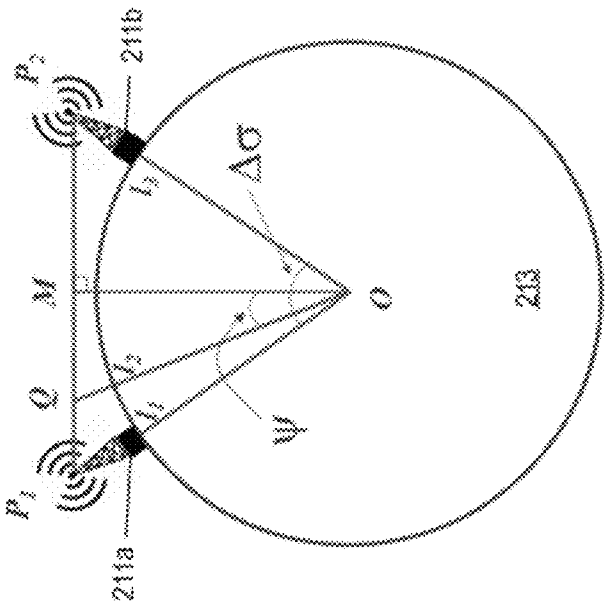
FIG. 2E is a schematic diagram illustrating an example, non-limiting embodiment of an LoS link processed according to the LoS analysis system functioning within the communication network of FIG. 1 in accordance with various aspects described herein.

Consider two points $P_1$ and $P_2$ corresponding to antenna towers 211*a*, 211*b*, generally 211, in which a longitude $\lambda_i$ and latitude $\varphi_i$ are the coordinates of point $P_i$, for i=1, 2, as depicted in FIG. 2E. The central angel Δσ between the vectors from the center of a spherical earth 213 to the points may be represented by:

$$\Delta\sigma=\arccos(\sin\varphi_1\sin\varphi_2+\cos\varphi_1\cos\varphi_2\cos(|\lambda_2-\lambda_1|)) \tag{9}$$

The computed distance is depicted in FIG. 2E. For simplicity, it may be assumed that both towers 211 have the same height h. The tower locations are denoted $l_1$ and $l_3$, whereas $l_2$ denotes a location of a point below the LoS, between the towers 211. The computed distance is the distance from the antennas to point Q on the LoS. Let O denote the center of earth 213. The points $P_1$ and $P_2$ are the locations of the antennas on the towers 211. The point M corresponds to a midpoint between the points $P_1$ and $P_2$. The distance between O and $P_1$, denoted $OP_1$, corresponds to $R_{earth}$+h, where $R_{earth}$ is earth radius in point $P_1$ and h is a height of the first tower 211*a*. Note that under the assumption of equal tower heights, $OP_1=OP_2$.

The angle $\angle P_1OM=\Delta\sigma/2$ is computed using Eqn. 9. The angle $\angle P_1OQ$ may also be computed using Eqn. 9, over the coordinates of points $l_1$ and $l_2$. Then, $\psi=\angle QOM=\angle P_1OM-\angle P_1OQ$.

$$OM=(R_{earth}+h)\cdot\cos\left(\frac{1}{2}\Lambda\sigma\right) \quad (10)$$

$$MP_1=\frac{R_{earth}+h}{\sin\left(\frac{1}{2}\Lambda\sigma\right)} \text{ and } MQ=\frac{OM}{\sin(\psi)} \quad (11)$$

$$QP_1=MP_1-MQ=\frac{R_{earth}+h}{\sin\left(\frac{1}{2}\Lambda\sigma\right)}-(R_{earth}+h)\cdot\frac{\cos\left(\frac{1}{2}\Lambda\sigma\right)}{\sin(\psi)} \quad (12)$$

Finally, $$QP_1=(R_{earth}+h)\cdot\left(\frac{\sin(\psi)-\sin\left(\frac{1}{2}\Lambda\sigma\right)\cos\left(\frac{1}{2}\Lambda\sigma\right)}{\sin(\psi)\sin\left(\frac{1}{2}\Lambda\sigma\right)}\right). \quad (13)$$

Figure 2F:
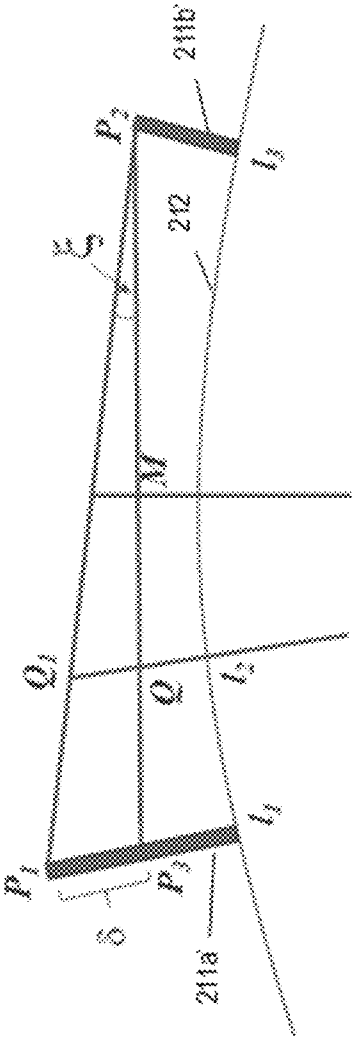
FIG. 2F is a schematic diagram illustrating an example, non-limiting embodiment of an LoS link processed according to the LoS analysis system functioning within the communication network of FIG. 1 in accordance with various aspects described herein.

Referring next to FIG. 2F, a case is depicted in which there is a height difference between the towers 211*a*', 211*b*', e.g., due to variations in tower construction and/or the terrain 212. Let δ represent the height difference. Then, the distance $P_1P_2$ may be approximated by $((P_2P_3)2+\delta^2)^{1/2}$. The angle $\xi=\angle P_1P_2P_3\approx\arctan(\delta/P_2P_3)$. Accordingly, $Q_1P_2\approx QP_2/\cos(\xi)$ and $Q_1P_1=P_1P_2-Q_1P_2$. The above computations provide for a given point $l_2$ on earth, located below the LoS, and a point Q, directly above it on the direct beam LoS, the distance between Q and the antennas on both sides. This yields the values $d_1$ and $d_2$ that may be applied to a computation of a Fresnel zone radius at that point. A distance between locations $l_1$ and $l_2$, as described above, may be denoted as $dist(l_1, l_2)$.

Example algorithms for computing LoS heights for receiver-transmitter antenna pairs are described below. In particular the example algorithms include one or more of fixed-drain solutions, min-height solutions and/or min-sum solutions. In at least some embodiments, the algorithms are applied according to a two-dimensional (2D) Fresnel zone. Alternatively or in addition, the algorithms may be modified the to address a three-dimensional (3D) Fresnel zone. A 2D Fresnel zone may be defined as a Fresnel zone buffer limited to directions down and up from the LoS, that is, an intersection of the Fresnel zone with a vertical plane that contains the LoS and a center of the earth.

Figure 2M:
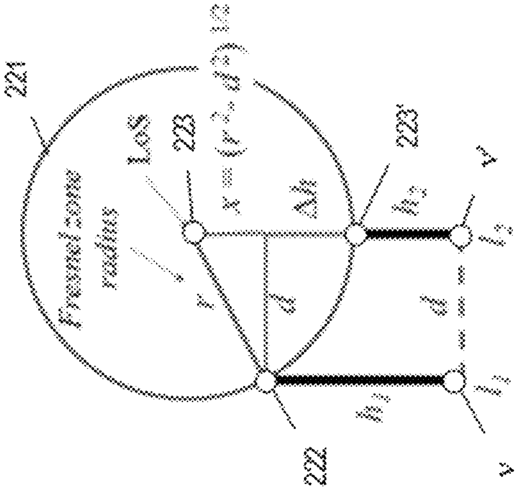
FIG. 2M is a schematic diagram illustrating an example, non-limiting embodiment of a cross section of a Fresnel zone of an LoS link processed according to the LoS analysis system functioning within the communication network of FIG. 1 in accordance with various aspects described herein.
Figure 2G:
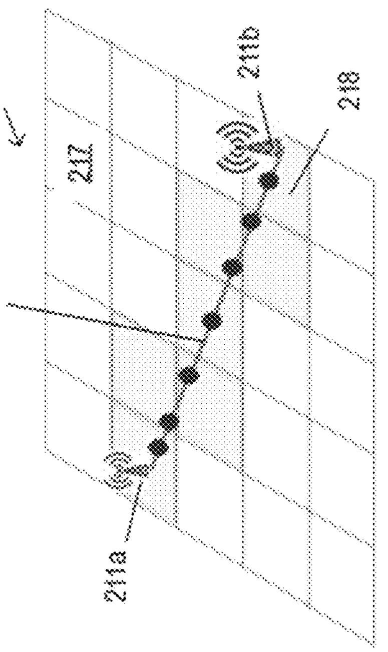
FIG. 2G is a schematic diagram illustrating an example, non-limiting embodiment of a terrain grid selection performed according to the LoS analysis system functioning within the communication network of FIG. 1 in accordance with various aspects described herein.

According to an initial step of the computation an elevation, e.g., an elevation profile, is determined for terrain below the LoS. In at least some embodiments, the elevation profile may include data obtained from a digital terrain map and/or heights or elevations determined according to one or more items above a surface of earth within the vertical LoS plane, such as buildings, towers, trees, and the like. Referring to FIG. 2G, let $l_1$ and $l_2$ correspond to locations of the towers 211*a*, 211*b* for which the test is conducted, and let L correspond to a line that connects them. The towers 211 are positioned with respect to a grid G 214. The grid 214 includes 3D bins of interest having a squared polygonal area s 218, and a corresponding height h, (s, h) such that a squared polygonal area of interest s 218 intersects the line L. When L intersects s, an elevation may be denoted as (L, s)=($L_m$, h), in which a point at a location $l_m$ is defined as follows. If the line L intersects s in a single point, $l_m$ may be taken as that point. If the line L intersects s in two points, the reference $l_m$ may be taken as a middle point between these two points of intersection. If the line L intersects s at an edge of the polygonal area s, the reference $l_m$ may be taken as a midpoint of the edge.

According to this initial step, a set S of elevation points (points with height) is determined, where the points are on a line L that connects the towers 211, exactly below the LoS, i.e., a line drawn between antennas at their respective heights on the towers. Each elevation point ($l_m$, h) may also be represented as a line obstacle ($l_m$, h) perpendicular to earth surface, starting from the point on the surface of earth and having length, or height h extending above the earth surface. These lines are depicted between the towers in FIGS. 2H, 2I, 2J. According to the example 2D computation, a solution may be obtained for a given pair of towers $T_d$ and $T_t$ and set S of elevation points, each having corresponding heights. The set S of elevation points may be considered as potential obstructions or interferers to one or more of a LoS and/or a corresponding Fresnel-zone.

According to some applications, antenna heights may be calculated according to step-by-step processes, e.g., in which calculations may be performed according to a minimum height on both towers, or a given fixed height for the drain. Then, in subsequent each step, the LoS and/or clearance of a Fresnel zone may be computed. If the test fails, the height of the antennas may be raised on one of the sides. This LOS and/or Fresnel zone computation may be repeated iteratively until a solution is discovered. There are, however, several limitations to such an approach. First, it does not find an optimal solution and the solution depends on the increment step. Second, the computation is inefficient, because the LoS and clearance tests are conducted per each step. If, for example, the tower height is 500 meters and the step increment is 10 meters, there might be a need to conduct up to 50 clearance tests for increments on just one side and 100 tests for increments on both sides. That is, the step-by-step algorithm has O(kn) time complexity, where n is a number of points in S and k is a ratio of the tower's height to the step size. Third, an intersection of a bin with a prolate spheroid (or an ellipse) is a complex and expensive computation. Such techniques may be applied to 2D Fresnel zones, but may not provide an ability to test clearance of 3D Fresnel zones. The following example algorithms offer improvements over such techniques.

An example technique for computing a fixed-drain solution is disclosed herein. Let a drain antenna tower $T_d$ having a range between minimum and maximum available antenna heights be identified by $T_d=(l_d, h^d_{min}, h^d_{max})$. Likewise, let a target antenna tower $T_t$ having a range between minimum and maximum available antenna heights be identified by $T_t=(l_t, h^t_{min}, h^t_{max})$. Locations $l_d$ and $l_t$ are identified for the towers, as well as a set S of elevation points of terrain and/or potential interfering objects. For a fixed-drain computation, the height $h_d$ of the antenna on tower $T_d$ is given.

Table 1, provided below, includes an example pseudo code, referred to as a 1st algorithm. The 1st algorithm computes optimal drain and target antenna heights ($h_d$, $h_t$) in a single pass over the elevation points in S. Initially, the 1st algorithm computes a slope for a potential LoS, where a height on the target tower $T_d$ is a minimum height (Line 1 of the example pseudo code of Table 1). Then, for each elevation point ($l_i$, $h_i$), the 1st algorithm computes a Fresnel-zone radius at point $l_i$ (Line 4 of the example pseudocode of Table 1), adds that to the height $h_i$ and finds the slope of the LoS that would prevent intersection with that elevation point (Line 6 of the example pseudocode of Table 1). A maximal slope per all the points in S and the slope for the minimum height $h^t_{min}$ is computed. Based on this maximal slope, a maximal slope height $h_t$ is computed (Line 9 of the example pseudocode of Table 1). If the maximal slope height $h_t$ is above the maximal height for the target tower, i.e., $h_t > h^t_{max}$ there is no solution. Otherwise, the pair $(h_d, h_t)$, computed with the maximal slope and representing an optimal solution for a fixed-drain scenario, is returned at the end of the loop.

Figure 2H:
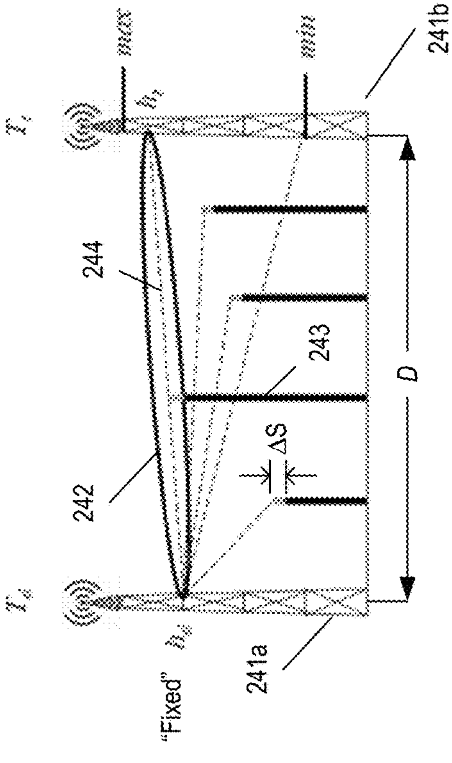
FIG. 2H is a schematic diagram illustrating an example, non-limiting embodiment of an LoS link, processed according to a fixed drain algorithm of the LoS analysis system functioning within the communication network of FIG. 1 in accordance with various aspects described herein.

When a solution is returned, it satisfies all the conditions of an optimal solution. That is, the solution of the 1st algorithm is optimal, at least because any lower value of $h_t$ would lead to an intersection of the Fresnel zone with a bin in a location for which the maximal slope was discovered. FIG. 2H, provides an illustration of different slope calculations for an example backhaul link scenario 240 having a first tower 241*a* separated from a second tower 241*b*, by a distance D. A straight line drawn between a drain antenna at $h_d$ and a target antenna $h_t$ represents an LoS 244. An ellipse 242 drawn about the LoS represents an intersection of a Fresnel-zone ellipsoid with a plane containing the antenna towers and the LoS. The different slopes are computed for obstacles 243 determined according to the set S of elevation points that may have different heights as illustrated. The obstacle height values S may be adjusted according to the Fresnel zone 242, e.g., increased by a width of the Fresnel zone, ΔS, determined at a location of the obstacle. A largest slope, after obstacle height values are adjusted according to the Fresnel zone, may be selected and used for computing $h_t$. Note that the computed solution guarantees that $h_t$ would not be above $h_{max}$.

A solution of an antenna height for each tower, if available, would satisfy the conditions that a direct line between the antennas does not intersect any 3D bin, that a corresponding Fresnel zone does not intersect any 3D bin, and that the height of each antennas falls within an applicable antenna height boundaries $[h_{min}, h_{max}]$ defined for that tower. The maximum slope solution, if one exists, represents an optimal solution for a fixed-drain scenario 240, because it is the lowest height $h_t$, at which an unobstructed LoS may be obtained taking into consideration a Fresnel zone, at least within a plane containing both towers and the LoS 244. Accordingly, the optimal target antenna height may be identified by applying the slope calculations over a single pass of the obstacle height values S.

According to the example 1st algorithm, computation requires a single pass over the elevation points in S, and it has O(n) time complexity, where n is a number of points in S, i.e., n=4 according to the simplistic example. In some embodiments, the points in S may be sorted before evaluating the different slopes. For example, the points in S may be sorted according to height at a beginning of the computation. Such a sorting of heights would allow the computation to start with the highest obstacles and then stop the computation early, i.e., before evaluating every single obstacle in the set S, if there is no solution. Although it seems intuitive, it was found that such a pre-sorting of the heights has an O(n·log(n)) time complexity, which may slow the computation compared to proceeding without a presorting. Hence, in at least some embodiments, the points S do not need to be sorted as part of the computation.

TABLE 1

| Fixed Drain Height Algorithm<br>Algorithm 1 Fixed Drain Height | |
|---|---|
| | Input: Towers $T_d$, $T_t$: height $h_d$: elevation points S |
| | Output: A solution $(h_d, h_t)$ |
| 1: | slope ← $(h_{min}{}^t)/\mathrm{dist}(l_d, l_t)$ |
| 2: | $h_t \leftarrow h_{min}{}^t$ |
| 3: | for $(l_i, h_i) \in S$ do |
| 4: | $r_i \leftarrow$ Fresnel-zone radius$(l_t)$ |
| 5: | $h_t{}^i = h_i + r_i$ |
| 6: | $\mathrm{slope}_i = (h_t{}^i - h_d)/\mathrm{dist}(l_d, l_i)$ |
| 7: | if $\mathrm{slope}_i >$ slope then |
| 8: | slope ← $\mathrm{slope}_i$ |
| 9: | $h_t \leftarrow h_d + \mathrm{dist}(l_d, l_t) \cdot \mathrm{slope}$ |
| 10: | if $h_t > h_{max}{}^t$ then |
| 11: | return No solution |
| 12: | return $(h_d, h_t)$ |

Figure 2I:
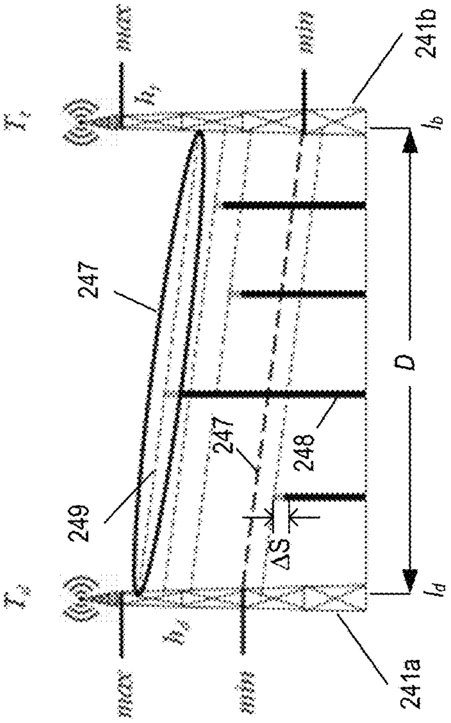
FIG. 2I is a schematic diagram illustrating an example, non-limiting embodiment of an LoS link, processed according to a min-max algorithm of the LoS analysis system functioning within the communication network of FIG. 1 in accordance with various aspects described herein.
Figure 2J:
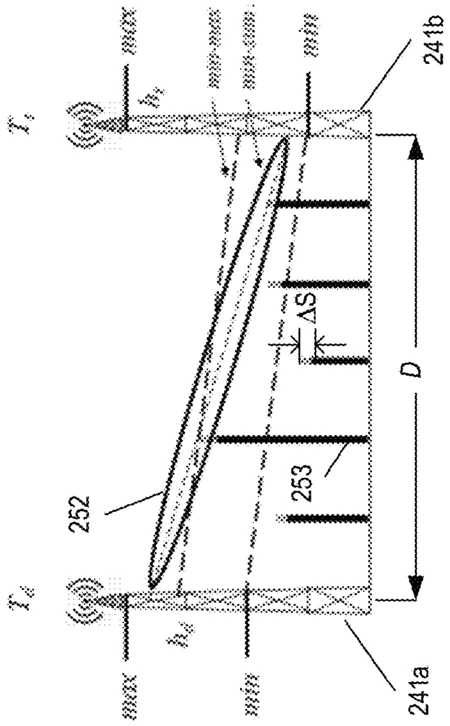
FIG. 2J is a schematic diagram illustrating an example, non-limiting embodiment of an LoS link, processed according to a min-sum algorithm of the LoS analysis system functioning within the communication network of FIG. 1 in accordance with various aspects described herein.

An example of another technique for determining optimal antenna heights is referred to herein as a min-max solution. The min-max approach minimizes a maximum height of either antenna of a backhaul link. FIG. 2I, provides an illustration of min-max calculations for an example backhaul link scenario 245 having a first tower 241*a* separated from a second tower 241*b*, by a distance D. A straight line drawn between a drain antenna at $h_d$ and a target antenna $h_t$ represents an LoS 249. An ellipse 247 drawn about the LoS represents an intersection of a Fresnel-zone ellipsoid with a plane containing the antenna towers and the LoS. As a starting point, two ends of a backhaul link, e.g., towers $T_d$ and $T_t$, are identified. The towers may be located on a map or grid, e.g., according to their latitude-longitude coordinates. Give the tower locations, a set S of elevation points may be determined along a line and/or a path extending between the two towers. Initially, the slope is computed based on the minimum height of the two towers. Then, while maintaining the slope for each obstacle (the same increments on both sides), the antennas are elevated to prevent intersection with that obstacle, if needed. Note that the Fresnel-zone radius is added to the obstacle height when computing the elevation.

An example of 2nd algorithm, the min-max algorithm, may be applied to the defined geometry and elevation points to obtain an optimal min-max solution for $T_d$ and $T_t$. The example 2nd algorithm may begin according to minimum height values of the towers, $h^d_{min}$ and $h^t_{min}$, e.g., minimum heights at which any antenna may be mounted or otherwise installed. For the minimum height values, a height difference from a base or lower extent of an antenna mounting range for each tower $T_d$, $T_t$ is 0, that is $h^d_{min} - h^d_{min} = 0$ and $h^t_{min} - h^t_{min} = 0$. A slope may be computed whereby a vertical or height difference of the minimum heights between the towers may be determined as $h^t_{min} - h^d_{min}$ min, associated with a value Δy, while a horizontal, e.g., a straight-line distance between the towers, not necessarily accounting for curvature of the earth or any elevational differences may be determined as $\mathrm{dist}(l_d, l_t)$ and associated with a value Δx. A slope value, e.g., of a minimum height LoS 247 between the min height values at each tower, may be set according to a slope of the solution Δy/Δx and may be used in a computation of intermediate heights. Using the predetermined minimum-height slope value, a testing LoS may be determined by effectively moving the minimum height LoS 247 upward, away from the base, whereby distances between each antenna and its corresponding base level may be equal for both antennas. Such an equal vertical offset will ensure that a constant slope Δy/Δx is maintained.

In at least some embodiments, the $2^{nd}$ algorithm may proceed in an iterative manner, e.g., by testing elevation points along the set of elevation points S for possible interference with the LoS, considering height offsets ΔS to account for the Fresnel zone, and updating the heights $h_t$ and $h_d$ when there is a need to increase the height to prevent intersection with an obstacle. If at some point, a height of one of the antennas, e.g., the $1^{st}$ antenna at the drain tower $h_d$ according to the illustrative backhaul link scenario 245, exceeds a maximum available height for that tower $h^d_{max}$, there may still be an option to increase a height of the other antenna, e.g., the $2^{nd}$ antenna at the target tower $T_d$ according to the illustrative backhaul link scenario 245. Should this situation occur, the $2^{nd}$ algorithm may call and/or otherwise incorporate the $1^{st}$ algorithm, by setting a height of the limiting antenna, e.g., the $1^{st}$ antenna at the drain tower $T_d$, to be fixed at its maximum value, e.g., $h^d_{max}$.

First, the computed height is in the range of allowed heights, per each tower. Second, there is Fresnel zone clearance and LoS because $h_d$ and $h_t$ are elevated to prevent interference, for all the points in S. Third, for any solution $(h'_d, h'_t)$, if $h'_d < h_d$ then $h'_t > h_t$ and in this case $\max\{h'_d - h^d_{max}, h'_t - h^t_{max}\} = h'_t - h^t_{min} > \max\{h_d - h^d_{min}, h_t - h^t_{min}\}$. Similarly, if $h'_t < h_t$ then $h'_d > h_d$ and in this case $\max\{h'_t - ht_{min}, h'_d - h^d_{min}\} = h'_d - h^d_{min} > \max\{h_d - h^d_{min}, h_t - h^t_{min}\}$. The computation only requires a single pass over S, so it has O(n) time complexity, where n is the number of points in S.

TABLE 2

Min-Max Algorithm
Algorithm 2 Min Max

Input: Towers $T_d$, $T_t$; elevation points S
Output: A min-max solution $(h_d, h_t)$
1:   $h_d \leftarrow h_{min}^d$
2:   $h_t \leftarrow h_{min}^t$
3:   slope $\leftarrow (h_{min}^t - h_{min}^d)/\text{dist}(t_t, t_d)$
4:   for $(l_i, h_i) \in$ S do
5:     $r_i \leftarrow$ Fresnel-zone radius$(l_i)$
6:     $h_{new} = h_i + r_i - \text{slope} \cdot \text{dist}(l_d, l_i)$
7:     if $h_d < h_{new}$ then
8:       $h_d \leftarrow h_{new}$
9:     $h_t = h_i + r_i + \text{slope} \cdot \text{dist}(l_i, l_t)$
10:  if $h_t < h_{new}$ then
11:     $h_t \leftarrow h_{new}$
12:  if $h_d > h_{max}^t$ then
13:     Call Alg. 1($T_d$, $T_t$, $h_{max}^d$, S). with fixed height $h_{max}^d$ for $T_d$
14:     return the answer of Alg. 1
15:  if $h_t > h_{max}^t$ then
16:     Call Alg. 1($T_t$, $T_d$, $h_{max}^t$, S). with fixed height $h_{max}^t$ for $T_t$
17:     return the answer of Alg. 1
18:  return $(h_d, h_t)$ Once again, a solution of an antenna height for each tower, if available, would satisfy the conditions that a direct line between the antennas does not intersect any 3D bin, that a corresponding Fresnel zone does not intersect any 3D bin, and that the height of each antennas falls within an applicable antenna height boundaries $[h_{min}, h_{max}]$ defined for that tower. To the extent there is a solution, the $1^{st}$ algorithm, called by the $2^{nd}$ algorithm, will return a valid result. However, to the extent a solution is not available or cannot be determined, a "No solution" message may be returned to the user. Likewise, if at some point, a height $h_t$ of the $2^{nd}$ antenna at the target tower $T_t$ exceeds a maximum available height for that tower $h^t_{max}$, the $2^{nd}$ algorithm may call and/or otherwise incorporate the $1^{st}$ algorithm, with reversed roles. Namely, the target antenna height $h_t$ may be fixed and set to be $h^t_{max}$ while the $1^{st}$ algorithm finds a minimum value for a height of the drain antenna $h_d$. Once again, to the extent a solution is not available or cannot be determined, a "No solution" message may be returned to the user.

In at least some embodiments, a "no-solution" result, e.g., as reported in a no-solution message may be accompanied by additional information. In at least some embodiments, one or more potential interfering elevation points in S may be identified responsive to a no-solution result. The results may be presented in a text message, a tabular form and/or in a graphical format. For example, any possible interfering points may be identified as points and/or regions on a map. An identification of the locations of any possible interferers alone or in combination with a map may allow a network planner to evaluate interferers and to identify mitigative measures, e.g., higher towers, new towers, alternative routes, and so on.

Referring to FIG. 2B, a graphical display 265 of results of one or more of the techniques disclosed herein is illustrated. The example graphical display 265 shows a terrain map 266. The terrain map may be a graphic, e.g., corresponding to one or more of a topological map, a road map, a geopolitical border map, a city or town planning map, and so on. Alternatively or in addition, the terrain map 266 may include photographic imagery as may be obtained from a drone and/or a satellite image. The illustrative example provides a bird's eye view satellite image showing vegetation, roads, and structures. More generally, the graphical display 265 be adapted to provide visualizations of one or more of the towers, the 3D bins, terrain elevations, and so on.

The illustrated portion of the terrain map is intersected by a LoS between two antenna towers, not shown. The LoS is a straight line between the antennas, having a first Fresnel zone defined about it. Depending upon terrain heights, the LoS and/or its first Fresnel zone may intersect one or more cells of a terrain grid. For example, the cells may encompass an area s, e.g., a square cell, with a corresponding height value h. One or more of the backhaul link planning and/or evaluation algorithms may be employed give the LoS and in view of the appropriate cells of the grid data. The grid cells may be identified as disclosed above, e.g., those cells intersecting a Fresnel zone of the LoS link projected onto the grid.

According to the illustrative example, bins of the grid that intersect, almost intersect or are far from the Fresnel zone may be depicted in a distinguishable manner, e.g., according to different colors and/or shading. According to the example graphical display 265, a first group of grid bins 267a that intersect the Fresnel zone may be depicted as red, while a second group of grid bins 267b that almost intersect the Fresnel zone are depicted as yellow and a third group of bins 267c that is far from the Fresnel zone are depicted as green. Other bins 268 that are located under the Fresnel zone, but according to their heights, do not intersect with it may be displayed in yet another color, such as blue. In at least some embodiments, a user interface provides functionality allowing a link planner to adjust a display of planning data including results, e.g., by allow for adjustments including one or more of pan, rotate, zoom, colorization, and the like.

An example of yet another technique for determining optimal antenna heights is referred to herein as a min-sum solution. The min-sum approach minimizes a sum of the heights of both antennas of a backhaul link. Once again, as a starting point, two ends of the backhaul link, e.g., towers $T_d$ and $T_t$, are identified. The towers may be located on a map or grid, e.g., according to their latitude-longitude coordinates. Give the tower locations, a set S of elevation points may be determined along a line and/or a path extending between the two towers. A $3^{rd}$ example algorithm may be applied to the defined geometry and elevation points to obtain an optimal min-sum solution for $T_d$ and $T_t$. The example $3^{rd}$ algorithm may begin according to minimum height values of the towers, $h^d_{min}$ and $h^t_{min}$, e.g., minimum heights at which any antenna may be mounted or otherwise installed.

The input consists of the drain and target towers $T_d$ and $T_t$. We compute the elevation points S and then call the $2^{nd}$ algorithm, i.e., the min-max solution, with parameters $T_d$, $T_t$ and S for an initial solution. If the $2^{nd}$ algorithm does not find any solution, then the computation may return with a "No solution" message. To compute a min-sum solution from a min-max solution, the min-max solution may be tilted to achieve an optimal min-sum solution. See illustration in FIG. 2J. Let $l_d$ be a location of a first tower $T_d$, with $l_d$ being a location of a second tower $T_t$, with $l_m$ being a location of a midpoint between them. If an obstacle from the set S of elevation points for which the height of the aforementioned min-max solution is between $l_t$ and $l_m$, the algorithm attempts to lower a height on the second tower $T_t$, whereas if that obstacle is between $l_d$ and $l_m$, the algorithm attempts to lower the height on the first tower $T_d$. Consequently, a corresponding decrease of the height on one side is bigger than the increase of the height on the other side, such that a total sum of heights $h_d$+$h_t$ become smaller.

In at least some embodiments, an example of the $3^{rd}$ algorithm starts with a solution of the $2^{nd}$, min-max algorithm and tilts the slop if necessary. If the tilting point is between the first tower $T_d$ and the midpoint between the towers $l_m$, then the $3^{rd}$ algorithm attempts to increase $h_d$ and decrease $h_t$, and vice versa. When increasing $h_d$, the algorithm computes the slopes with $h_{max}$ on $T_d$ and $h_{min}$ on $T_t$ to ensure that the tilting does not exceed height boundaries (see lines 9 and 10 of the example pseudo code presented in Table 3). It then computes for each obstacle ($l_i$, $h_i$) between the tilting point and tower $T_t$ the slopes of a line that goes through the top of the tilting obstacle and the top of ($l_i$, $h_i$). A new slope, which is a tilt that satisfies all the constraints, is selected (see, e.g., line 15 of the pseudocode presented in Table 3).

If the selected constraint is between the tilt constraint and the midpoint $l_m$, this elevation point replaces the tilt point, and the tilt is recalculated. Otherwise, the new slope is used to compute the new height values ($h_d$, $h_t$). Note that in each step of the loop, the tilting point gets closer to $l_m$ or the tilting ends, hence, the number of tilts is smaller than that number of points in S. Also note that each tilt decreases the sum of heights, until no decrease is possible anymore. The case where the tilting point is between tower $T_t$ and the midpoint $l_m$ is symmetric and computed in the same way with reversed roles.

Figure 2K:
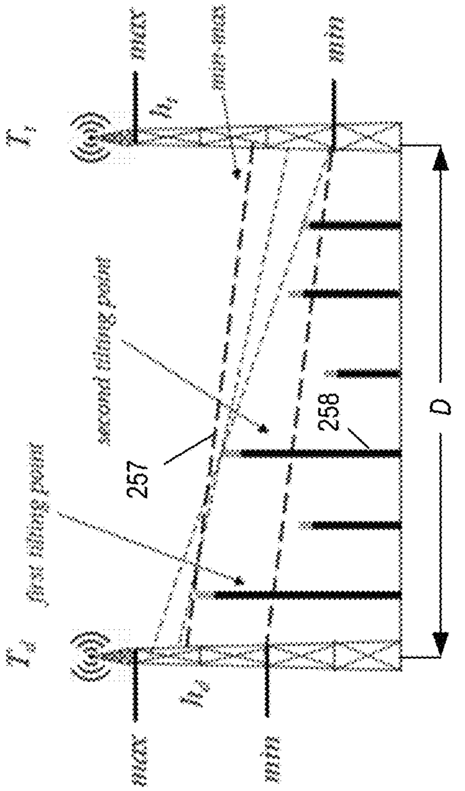
FIG. 2K is a schematic diagram illustrating an example, non-limiting embodiment of an LoS link, processed according to a min-max algorithm of the LoS analysis system functioning within the communication network of FIG. 1 in accordance with various aspects described herein.
Figure 2L:
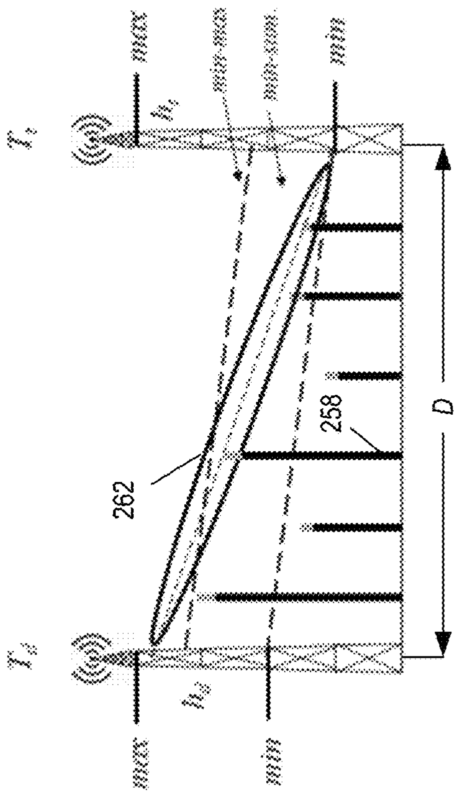
FIG. 2L is a schematic diagram illustrating an example, non-limiting embodiment of an LoS link, processed according to a min-max algorithm of the LoS analysis system functioning within the communication network of FIG. 1 in accordance with various aspects described herein.

FIGS. 2K and 2L illustrate tilts according to the $3^{rd}$ example min-sum algorithm, for the case where there are two tilts, i.e., the tilting point changes. FIG. 2K illustrates a first scenario 255 in which a drain and target antenna towers $T_d$, $T_t$ are separated by a distance D. A straight line representing an LoS 257 is drawn between antennas at their respective heights on the towers, e.g., after implementing the min-max solution according to the $2^{nd}$ example algorithm. Give the tower locations, a set S of constraints or elevation points 258 may be determined along a line and/or a path extending between the two towers. Titling points are identified, and the tilts calculated according to the algorithm. FIG. 2L illustrates the same tower configuration, adding a Fresnel zone 262 about the LoS.

For each tilting point, the computation of ($h_d$, $h_t$) is in linear time in the size of S. At the worst case, the number of tilting points is O(n), where n is the number of points in S. However, in practice the number of tilting points is bounded, and the computation has linear time complexity in the size of S. As an optimization, elevation points may be ignored that are below the line L between $h^d_{min}$, $h^t_{min}$ that connects the base points $h^d_{min}$ and $h^t_{min}$ on the two towers.

TABLE 3

| | Min-Sum Algorithm<br>Algorithm 3 Min Sum |
|---|---|
| | Input: Towers $T_d$, $T_t$: elevation points S |
| | Output: A min-max solution ($h_d$, $h_t$) |
| 1: | Use Alg. 2 to compute a min-max solution ($h_d$, $h_t$) |
| 2: | if Alg. 2 returns "No solution" then |
| 3: | return "No solution" |
| 4: | let ($l_{tilt}$, $h_{tilt}$) be an elevation point much that $L_{hd,ht}$, intersects obstacle($l_{tilt}$, $h_{tilt}$) on its top boundary point. |
| 5: | $l_m \leftarrow$ midpoint($l_d$, $l_t$) |
| 6: | if ltilt $\in$ \|$l_d$, $l_m$\|then |
| 7: | slope $\leftarrow (h_t - h_d)/\text{dist}(l_t, l_d)$ |
| 8: | loop |
| 9: | $\text{slope}_{hmax} \leftarrow (h_{tilt} - h_{max}{}^d)/\text{dist}(l_{tilt}, l_d)$ |
| 10: | $\text{slope}_{hmin} \leftarrow (h_{min}{}^t - h_{tilt})/\text{dist}(l_t, l_{tilt})$ |
| 11: | $A_{slope} \leftarrow (\text{slope}_{hmax} - \text{slope}_{hmin})$ |
| 12: | for ($l_t$, $h_i$) $\in$ S such that $I_t \epsilon$ \|$l_{tilt}$, $l_t$\| do |
| 13: | $\text{slope}_t \leftarrow (h_i - h_{tilt})/\text{dist}(l_t, l_{tilt})$ |
| 14: | $A_{slope} \leftarrow A_{slope} \cup (\text{slope}_t)$ |
| 15: | new_slope $\leftarrow \max(A_{slope})$ |
| 16: | let j be the index of ($l_j$, $h_j$) associated with new_slope |
| 17: | if $l_j \in$ \|$l_{tilt}$, $l_m$) then |
| 18: | $l_{tilt} \leftarrow l_j$ and $h_{tilt} \leftarrow h_j$ |
| 19: | else |
| 20: | $h_d \leftarrow h_{tilt}$ + new_slope · dist($l_d$, $h_{tilt}$) |
| 21: | $h_t \leftarrow h_{tilt}$ + new_slope · dist($l_t$, $h_{tilt}$) |
| 22: | return ($h_d$, $h_t$) |
| 23: | else |
| 24: | let $l_m$ be the line between earth center and $l_m$ |
| 25: | rotate the setting by 180° around $l_m$(mirroring) |
| 26: | apply the above computation |

According to the aforementioned $1^{st}$, $2^{nd}$ and $3^{rd}$ example algorithms, solutions are determined according to testing for clearance of a 2D Fresnel zone, i.e., in a plane containing the towers $T_d$, Tt and the LoS 257. To keep the computation efficient in the case of 3D Fresnel zones, we apply a reduction of the 3D case to the 2D case. Intuitively, obstacles that are not directly below the LoS but may intersect the 3D Fresnel zone at a location not in the plane containing the $T_d$, Tt and the LoS, are projected or otherwise moved into the same plane. Consequently, these other objects may be redrawn to appear below the LoS 257, after adjusting for their respective heights. It is worth noting that the original set of elevation points S includes obstructions that fall directly below the LoS. The obstructions may extend outside of the LoS plane containing the towers $T_d$, $T_t$, but their corresponding height is determined as their intersection with the LoS plane.

By way of example, and according to a first step of a computation the Fresnel zone is projected onto the ground, below the LoS. Bins (s, h) of the grid G having an area s, e.g., a squared area, that intersects the Fresnel zone projection are identified. These intersecting cells may be identified by the grid cells of G that are below the Fresnel zone. Let $L_{ld,lt}$, be the line on the ground between the location $l_d$ of tower $T_d$ and the location $l_t$ of tower $T_t$. For each bin (s, h), if the line $L_{ld,lt}$ intersects s, we add to S a representative point of the intersected cell, e.g., a midpoint of the intersection segment, with the intersected segment having a corresponding height h. Alternatively or in addition, two vertexes of the intersected grid cell area s that are closest to $L_{ld,lt}$ may be taken and added to the set of constraints S with heights h, if their distance from $L_{ld,lt}$ does not exceed the Fresnel zone radius at this location. In at least some instances, the midpoints and/or vertices may not be directly below the LoS. This considers potential obstructions at locations not within the LoS plane that includes the towers, but intersecting other regions of the Fresnel zone ellipsoid. Hence, given a vertex or point v that was added to s and is not below the LoS, the following steps may be applied. Referring next to FIG. 2M, an adjusted point v' may be found, which corresponds to a projection of the LoS onto the line $L_{ld,lt}$ at a point between the antenna towers. Note that the vertex v' is below the LoS and in a plane perpendicular to the LoS that also contains the point v. Next, a first corresponding point 223 above v' may be found on the LoS, and a radius r of the Fresnel zone computed at that point, based on a corresponding distance from the antennas. Then, for replacing a constraints in v by a constraint in v', the height may be adjusted.

In at least some embodiments, a height adjustment may be accomplished in a manner that is illustrated in the scenario 220 FIG. 2M, which illustrates a cross section 221 of the Fresnel zone ellipsoid, taken perpendicular to a corresponding LoS. According to the illustration, the LoS is perpendicular to the page, e.g., representing a cut of the Fresnel zone 234 (FIG. 2D). Let $l_l$ and $h_l$ be a location and height of a point 222 above v, e.g., obtained from a terrain map and/or terrain development data. A location of v' 223 is represented by $l_2$. The value d=dist($l_1$, $l_2$) represents a distance between v and v'. A value $x=(r^2-d^2)_{1/2}$ may be computed and then a value of $\Delta h=r-x$ determined as a difference between r and x. Accordingly:

$$h_2=h_1-\Delta h=h_1-r+(r^2-d^2)^{1/2}, \quad (14)$$

where r is the Fresnel zone radius at the point above v'.

In at least some embodiments, a geospatial data model is represented using 3D bins. Bin data may contain information about terrain, e.g., the local ground level relative to sea level and heights, e.g., local object heights relative to ground level. In at least some embodiments, a basic form of each type of bin data may be obtained from United States Geological Survey (USGS) map data. For example, a USGS Digital Elevation Model (DEM) may be used for terrain and a National Land Cover Database (NLCD) categories may be added to and/or otherwise combined with the DEM to produce heights. These are both examples of publicly available datasets, see: https://www.usgs.gov/core-science-systems/ngp/3dep/about-3dep-products-services; https://www.mrlc.gov/data/nlcd-2016-land-cover-conus. It is understood that any other elevation data may be used in combination with and/or in lieu of these datasets, e.g., in places that are not covered by these datasets or in places where more accurate elevation data may be available.

The USGS DEM data may be available in resolutions as fine as a 1-meter grid, but presently the fine-resolution dataset does not provide complete nationwide coverage. In the interest of uniformity, terrain bin data may be determined according to ⅓ arc-second data, e.g., roughly 10-meter resolution, which is presently available in the U.S. with nationwide coverage. The NLCD data also comes in approximately 10-meter resolution, and is nationwide, so it is a suitable adjunct to the DEM data to produce a nationwide Digital Surface Model (DSM). According to the USGS, the vertical accuracy of the DEM is within 3 meters, with 95% confidence, whereas the NLCD is categorical data with accuracy that is considered to be between 71% and 97%.

Both sets of data are presently available in a raster format, which may be pre-processed for storage in an alternative format, e.g., as a partitioned PostGIS table with clustered geospatial indexing. Accordingly, the contiguous 48 USA states may be covered by 944 geospatial cells (USGS DEM), each containing as many as 100 million bins (or reference points). The NLCD comprises 8 billion geospatial reference points. A resulting database formed in this manner would represent approximately 12 TB of data, including the index information.

Alternatively or in addition, as a further optimization, the same terrain and height information may be stored in shared objects (shared library) on a solid-state drive (SSD). For example, a shared object may be created per each 1'×1' of latitude and longitude, including all of the 3D bins in an applicable area. Since indexing is inherent in the shared object structure, this storage is also quite compact (180 GB for DEM, 180 GB for NLCD).

Additional refinements to this approach are also available. For example, information that may be considered better, even if it is not nationwide, may be referenced as part of a hierarchical retrieval allowing better data to be used wherever it is available. This form of hierarchical retrieval may be done with proprietary terrain and height data providing results that are more accurate (more reliable and/or more recent) and have finer granularity, e.g., 1 meter resolution instead of 10 meters. At present, such data is mostly available for large metropolitan areas. It could also be done with the higher resolution (1-meter) USGS DEM data, if needed.

Figure 2O:
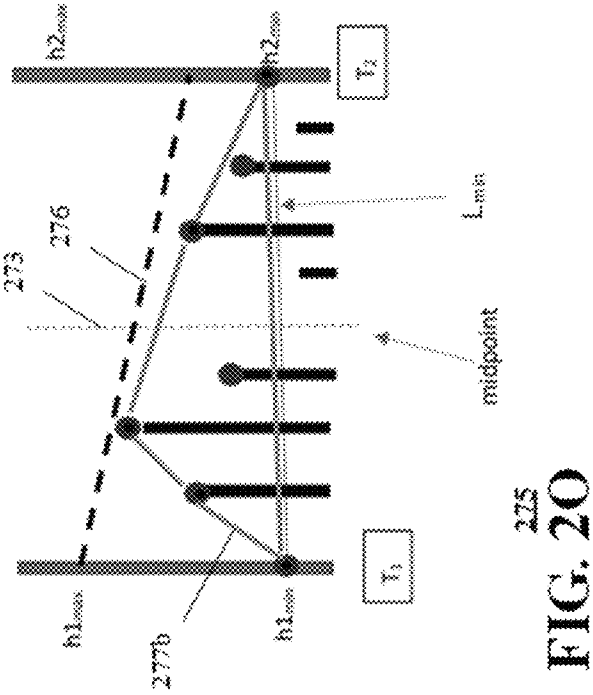
FIGS. 2N-2P are a schematic diagrams illustrating an example, non-limiting embodiment of an LoS link analysis, processed according to the LoS analysis system functioning within the communication network of FIG. 1 in accordance with various aspects described herein.
Figure 2N:
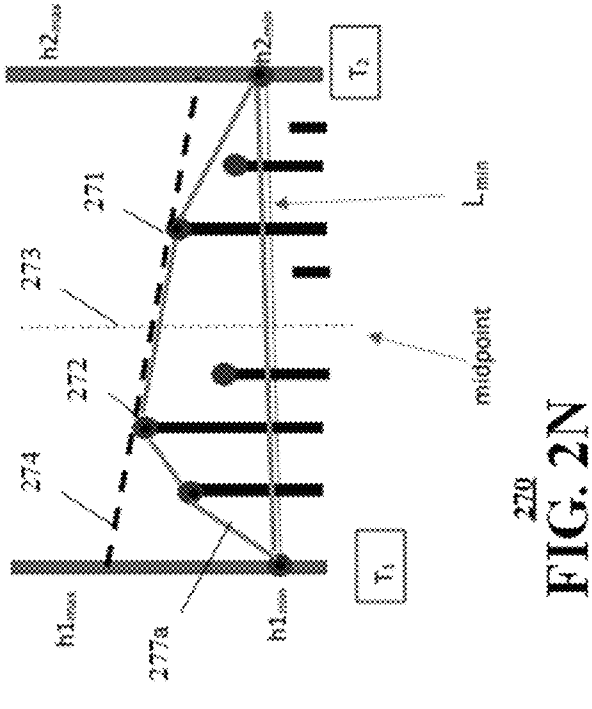

Referring next to FIG. 2N, an example LoS scenario 270 is illustrated in which an LoS link is analyzed between first and second tower $T_1$, $T_2$. The first tower $T_1$ has a first antenna location range extending from a minimum height of $h_{1min}$ to a maximum height of $h_{1max}$ and the second tower $T_2$ has a second antenna location range extending from a minimum height of $h_{2min}$ to a maximum height of $h_2$. A number of potential obstructions, referred to as constraints 271, are located between the towers.

Let the points 272 in a set S represent the tops of the constraints 271 between the towers, after adjustment to a Fresnel zone radius. Suppose that $L_{min}$ is a line that connects $h_{1min}$, and $h_{2min}$. All the points 272 in S that are below the line $L_{min}$ are irrelevant for the computation and may be ignored. A modified set $S_c$ may be defined as the set S after the removal of the points below the line $L_{min}$ and after adding the points on the towers $T_1$ and $T_2$ at heights $h_{1min}$ and $h_{2min}$. According to the illustrative example, the black vertical bars represent the obstacles or constraints 271, and the red circles or points at the top portions of at least some of the constraints 271 are the points in the modified set $S_c$.

An algorithm may be defined in which relevant points of the modified set $S_c$ are identified first. Next, a convex hull 277*a* of the points in $S_c$ is determined according to a convex hull algorithm. A second set of points C, taken from the modified points $S_c$ define vertices of the convex hull 277*a*. The set of points C are represented by the vertical bars with circles or points at the top, with a black dot drawn within the circle. To the extent that an LoS solution exists for the example LoS scenario 270, it may be determined according to one of multiple, e.g., three options. Should a solution exist, such as the one depicted as case 270 (FIG. 2N), that solution would be returned. Should one of the points in C closest to the midpoint 273 be $h_{1min}$ or $h_{2min}$, then a solution as presented as case 278 (FIG. 2P) may be returned. Should there be no solutions in either or both of cases 270 or 278, then another solution, e.g., one where a line goes via $h_{1max}$ or $h_{2max}$, as in case 275 (FIG. 2O), may be returned.

According to a first option, depicted as a first scenario 275 in FIG. 2O, a first particular line 276 is defined via a first maximum height $h_{1max}$ on tower $T_1$ and a point in C, where the point is between $h_{1max}$ and a midpoint 273 between the first and second towers $T_1$, $T_2$. Additionally, the first particular line 276 does not intersect an interior of a convex hull 277*b* formed according to the points in C. This first particular line 276 represents a the line having the largest slope among all lines via the first maximum height $h_{1max}$ and any point in C. This first scenario 275 may also apply to a symmetric case for point $h_{2max}$ of tower $T_2$ and a point between $h_{2max}$ and the midpoint 273.

According to a second option, depicted as a second scenario 270 in FIG. 2N, a second particular line 274 is defined via the following two points in C—the point 271 that is closest to the midpoint 273 from the right and point 272 that is closest to the midpoint 273 from the left. Additionally, the following criteria are also met: (i) the second particular line 274 does not intersect a convex hull 277*b* formed according to the points in C; (ii) an intersection of the second particular line 274 with the first antenna tower $T_1$ is withing the range defined between $h_{1min}$, $h_{1max}$; and (iii) an intersection of the second particular line 274 with the second antenna tower $T_2$ is withing the range defined between $h_{2min}$, $h_{2max}$.

Figure 2P:
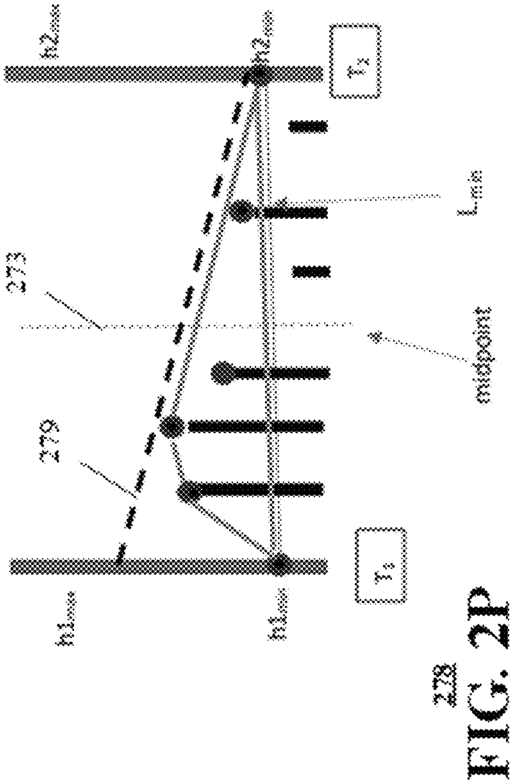

According to a third option, depicted as a third scenario 278 in FIG. 2P, a third particular line 279 is determined as the line via a point $h_{2min}$ when this point is in C that is closest to the midpoint from the right. This scenario may also be applied to a symmetric case for a point $h_{1min}$ of tower $T_1$ and a closest point to the midpoint 273 from the left.

Figure 2Q:
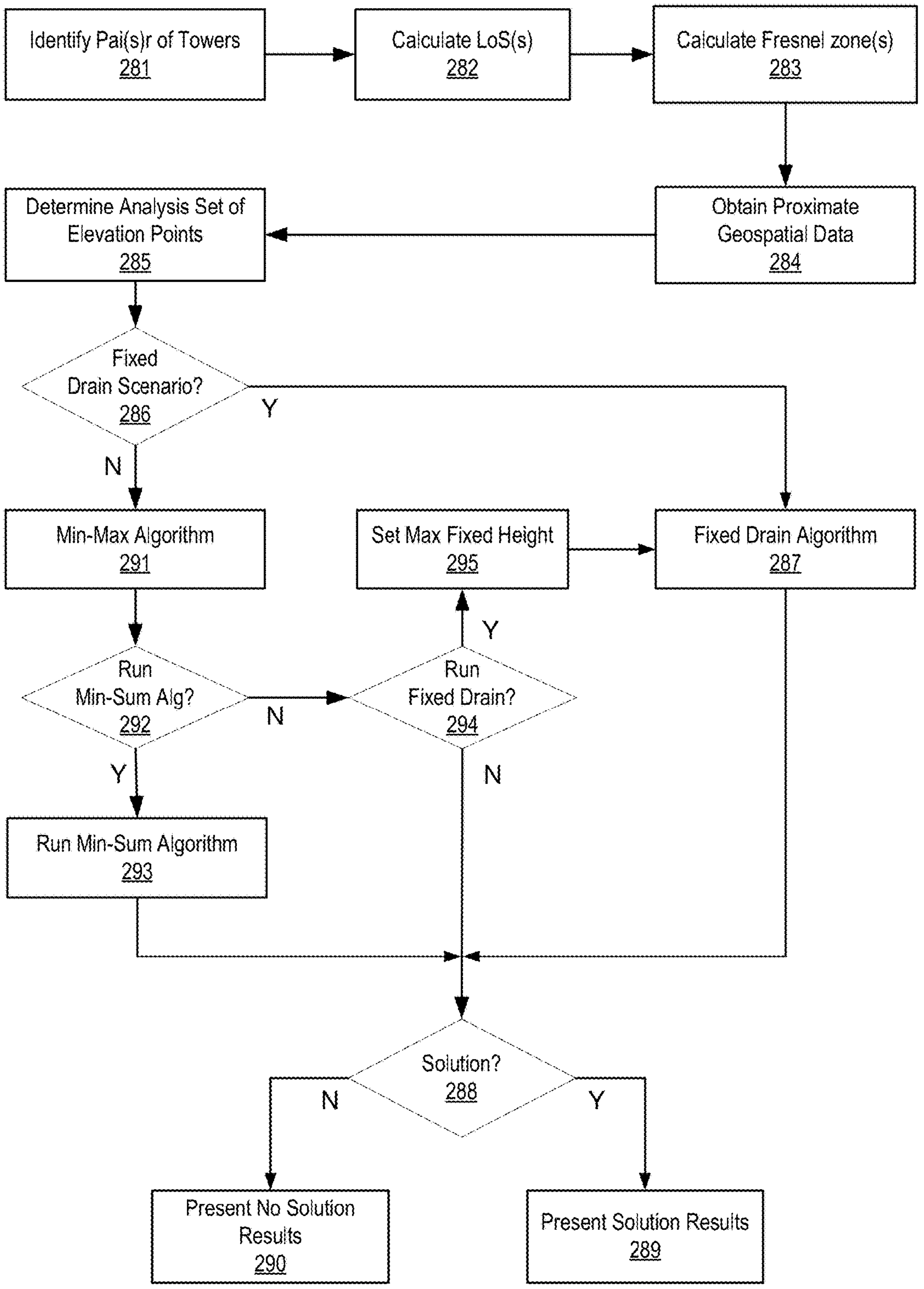
FIG. 2Q depicts an illustrative embodiment of a process in accordance with various aspects described herein.

FIG. 2Q depicts an illustrative embodiment of a process 280 adapted for analyzing LoS links in accordance with various aspects described herein. The process 280 includes identifying at 281 a pair of towers between which an LoS link is sought. As disclosed herein, the towers may be referred to as a drain tower, $T_d$ and a target tower, $T_t$. The towers $T_d$ and $T_t$ are identified in relation to a reference coordinate system. For example, each tower $T_d$, $T_t$ may be located at a corresponding location $l_d$, $l_t$, which, in turn, may be identified by an x-y coordinate on a horizontal grid and/or a latitude-longitude. Each tower $T_d$, $T_t$ may have an available antenna height location and/or a range of such available locations. The height values $h_d$, $h_t$ may extend from some minimum value $h^{d}_{mm}$, $h^{t}_{min}$ to some maximum value $h^{d}_{max}$, $h^{t}_{max}$. The heights may be determined according to one or more of a height of the tower, a range of heights at which antennas may be located that is less than the height of the tower, or a particular fixed height, e.g., at which an existing antenna is already mounted at.

It is envisioned that in at least some embodiments, the available range of available heights may be contiguous, e.g., extending from the minimum to maximum heights. Alternatively or in addition, the range of heights may include separate non-contiguous ranges of locations upon one or more of the towers. In at least some embodiments, the range of heights may include more than one discrete locations, e.g., of already mounted antennas and/or available mounting slots. It is understood that real estate on at least some towers may be a scarce commodity, e.g., being shared with competing applications.

Having established the endpoints of a link under analysis, an initial LoS estimate may be determined at 282 as a line joining the towers, without necessarily taking account of any height values. Such an LoS estimate would be sufficient to project onto a terrain grid to facilitate identification of terrain grid cells that intersect and/or are nearby to the estimated LoS. Alternatively or in addition, the LoS may be determined or otherwise calculated at 282 according to a pair of heights of the heights on the towers. The LoS is a straight line between the two endpoints.

The process 280 further includes determining Fresnel zone at 283 corresponding to the LoS. The Fresnel zone will depend upon a frequency and/or frequency band of operation. The Fresnel zone can be envisioned as a prolate spheroid, e.g., an ellipsoid, having its major axis aligned with the LoS. A width of the ellipsoid varies according to a location or displacement along the LoS, being widest at its midpoint.

The analyses may be determined according to a geometry of the ground and/or structures upon the ground along the LoS. In at least some embodiments, proximate geospatial data may be obtained at 284. The geospatial data may include elevation data at latitude-longitude coordinate pairs, proximate geospatial data being identified according to proximity of the elevation data location in view of the LoS. For example, Geospatial data may be defined according to a square grid of area s, each area of the grid having a corresponding terrain height h. For example, obtaining proximate data may include selecting those grid tiles that intersect one or more of the LoS and/or the Fresnel zone. In at least some embodiments, the analyses may be conducted according to a buffer zone, e.g., a range extending beyond the Fresnel zone. The buffer zone may be a fixed value. Alternatively or in addition, the buffer zone may be variable, e.g., varying as a percentage of the Fresnel zone.

It is understood that locations of at least some grid cells may have additional structure that extends vertically above the ground elevation, e.g., an obstruction height that may be added to the elevation above mean sea level. Such obstructions may include natural structures, such as trees, crops, and the like. Alternatively or in addition, such obstructions may include one or more of man-made structures, such as buildings, utility poles, cables, other antenna towers, and the like. Some obstructions may be fixed, e.g., a building, whereas other obstructions may be mobile, e.g., vehicles upon a roadway, trains upon rails, shipping upon water, and the like. The set of elevation points may be determined at 285 as corresponding heights of each grid cell that intersects a projection of the LoS and/or that intersects a projection of the Fresnel zone alone or with a buffer, if applicable. The heights may include the terrain elevation added to an actual height of an obstruction upon the ground and/or an estimate height of such an obstruction, e.g., a max height of a vehicle for roadway applications.

A determination is made at 286 as to whether a fixed-drain scenario is applicable. To the extent at least one of the antenna towers offers only a fixed height, a fixed-drain scenario may be appropriate. To the extent the fixed-drain scenario applies, a fixed-drain algorithm is performed at 287. The fixed drain algorithm may include an algorithm according to the pseudo code of Table 1. A determination is made at 288 as to whether a fixed-drain solution exists. To the extent a solution does exist, the solution results may be presented at 289 to a user, e.g., a network engineer, an analysist, and/or network operation and maintenance personnel. Presentation of the solution results may include one or more of a simple message or statement confirming the existence of a solution, a height value, or height values, a frequency or wavelength at which the results were accomplished, tower locations, and the like. In at least some embodiments, presentation of the solution results may include graphical results, e.g., showing the 3D grid cells with a color coding suggesting the link would be operable at the solution height(s).

To the extent a solution does not exist, the "no solution" results may be presented at 290 to the user. Once again, presentation of the solution results may include one or more of a simple message or statement confirming the lack of an available solution for the prescribed scenario, a height value, or height values, a frequency or wavelength at which the results were accomplished, tower locations, and the like. In at least some embodiments, presentation of the no solution results may also include graphical results, e.g., showing the 3D grid cells with a color coding to facilitate identification of those cells at which the elevation points interfered with LoS operation.

Application of the fixed-drain solution may be performed in a single pass, e.g., considering elevation heights of the set of elevation points and performing no more than one calculation for each elevation point. A solution indicates that an unobstructed LoS is possible for the prescribed terrain, with the variable height being the lowest height in a range of variable heights of the target tower.

To the extent it was determined at 286 that a fixed-drain scenario is not applicable, the process 280 may perform a min-max algorithm at 291. The min-max algorithm may include an algorithm according to the pseudo code of Table 2. A determination may then be made at 292 as to whether a min-sum solution should be performed. To the extent it is determined at 292 that a min-sum solution should be performed, the process 280 may continue by performing a min-sum algorithm at 293. In at least some embodiments, the min-sum algorithm may include steps according to the pseudo code of Table 3. A determination may then be made at 288 as to whether a min-sum solution exists. To the extent a min-sum solution does exist, the solution results may be presented at 289 and to the extent a solution does not exist, a no-solution result may be presented at 290.

To the extent it is determined at 292 that a min-sum solution should not be performed, a further determination may be made at 294 as to whether the fixed drain algorithm should be run. For example, if a solution is not obtained for the min-max algorithm performed at 291, the process 280 may continue by performing a fixed-drain algorithm at 287. In such instances, a height at one of the towers $T_d$, $T_t$ would have reached its maximum value without there being a solution according to the min-max algorithm. In such instances, a fixed drain height of the fixed drain algorithm may be set to the corresponding max height, understanding it may be the drain of the target. The fixed-drain algorithm would then be run at 287 and a determination made at 288 as to whether a solution was obtained. Likewise, to the extent a determination was made at 294 that the fixed drain algorithm should not be run, the process 280 also proceeds to step 288 to determine whether a solution exists. To the extent fixed drain solution does exist, the solution results may be presented at 289 and to the extent a solution does not exist, a no-solution result may be presented at 290.

While for purposes of simplicity of explanation, the respective processes are shown and described as a series of blocks in FIG. 2Q, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Experiments have been conducted to evaluate the system, that illustrate computation times with the settings described hereinabove. The experiments were designed to examine effects of different parameters on computation time. Examples of at least some of the parameters considered include a comparison of running times for height computation using different algorithms. According to observed test results, a retrieval time refers to a time taken to select and retrieve relevant bins from a database, whereas a computation time refers to a time taken to compute optimal antenna heights after retrieval of the bins. When testing Fresnel zone clearance in a 3D setting, the number of bins that participated in the test was much larger than the number of bins that are examined in a 2D setting, an effect also observed with respect to the computation times.

Other variants investigated included the effect of caching. For example storing information in a cache memory rather than bringing the data from a database, which typically helped speed up computations. Computation time was observed according to further variants included effects of distance between the towers, transmission frequency as it affects the Fresnel zone.

A simple algorithm that for a given pair of towers, $T_d$ and $T_t$, incrementally tests LoS and clearance of the Fresnel zone was used as a baseline. It started with $h_d \leftarrow h^d_{min}$ and $h_t \leftarrow h^t_{min}$. In each step, it tested a clearance of the Fresnel zone with respect to a given obstacles, e.g., obstacles retrieved via 3D bins of the grid. If there was no clearance, the lower height among $h_d$ and $h_t$ (or one of them, arbitrarily, if they are equal) is raised by an incremental value, e.g., 5 feet. The process was continued until a clearance of the Fresnel zone was obtained, or one of the heights exceeded a maximum height ($h_d > h^d_{max}$ or $h_t > h^t_{max}$). This baseline algorithm was referred to as a step-by-step computation.

The step-by-step computation typically had an average error that was found to be about half the size of the step. Decreasing the step size improved the accuracy but increased the running time, and vice versa. For example, when applying the step-by-step algorithm to towers with a height of 300 feet using a step size of 20 feet, the expected error is of 10 feet, and approximately 30 steps were required to discover that there is no line of sight between the towers. For a step size of 10 feet, the error was around 5 feet, but about 60 steps were executed before discovering that there was no LoS. In comparison, the algorithms disclosed herein compute the optimal solution according to the definitions provided above; while requiring only a single pass over the obstacles. Namely, the effect of each obstacle on the overall solution was considered no more than one time in determining an optimal solution for a give tower configuration.

Although the step-by-step algorithms are inefficient and do not compute an optimal solution, they have been used by previous systems for computing antenna heights, as part of wireless backhaul planning. Hence, the step-by-step computation provided a suitable benchmark.

To test performances of the novel system different workloads were used. Each workload included a set of pairs of towers, namely, one pair of towers, and/or many pairs of towers. The workloads investigated were synthetic tower locations with distances between towers being generated according to a random number generator, to reflect a variety of areas and distances. Note, however, that the geospatial data used for LoS tests was real. Workloads were generated as follows. The input consisted of (1) a selected number of pairs to generate, (2) a distance range between the towers of every pair, and (3) a bounding box that the generated pairs should fall inside. A random number generator was used to pick a point $l_1$ for one tower. Then, a random distance d in the given range and an arbitrary angle $\alpha$ were selected. The position of a second tower was a point at a distance d from $l_1$ at angle $\alpha$. Due to business confidentiality, no information about the network topology was used.

The evaluations also included effects of the frequency on computation times. Running times were observed and recorded in milliseconds, e.g., using a fixed-drain algorithm as a function of a distance between the towers, for different transmission frequencies. Reported times were obtained for 3D Fresnel zones while using cache. All reported times were presented as average time over a fixed number, e.g., 10, independent runs, for a fixed number, e.g., 10, different pairs of towers.

Results indicated that computation time grew almost linearly as a function of the distance. This may be a result of a number of bins between the towers growing as a linear function of the distance between the towers. When comparing computations for towers with LoS between them and towers with no LoS between them, for the case when there was no LoS the computation was faster, because the algorithm was permitted to stop as soon as it discovers that there was no solution.

The frequency is the inverse of the wavelength, so as the frequency grows, the Fresnel zone radius gets smaller. Thus, for higher frequencies, there were less 3D bins to retrieve and process allowing the computations to be completed sooner, resulting in lower running times.

For cases in which the frequency was not given, it was determined as a function of the distance. Note that as the distance between the towers grew, the frequency decreased, while the Fresnel zone radius grew bigger. So, bigger distances require more attention to the Fresnel zone.

Computation of a 3D Fresnel zone was more expensive than computation of a 2D Fresnel zone, because more bins were involved in the computation, due to the transformation and inclusion in the computation of bins that are below the Fresnel zone but are not directly below the LoS. The effect on a running time of testing clearance of 3D Fresnel zones versus tests for 2D Fresnel zones for the case was observed for a case in which where there was no LoS, and another case in which there was LoS between the towers. As expected, computation with a 3D Fresnel zone was more expensive and affected all the algorithms. This may have resulted from many more bins being included in a computation when retrieving bins to test clearance of a 3D Fresnel zone instead of retrieving only the bins that are below the LoS.

With respect to caching, it was found that typically, cache can speed up computations significantly, because when using a cache, data are retrieved from a fast storage device like the memory instead of retrieval from the disk. To test the effect of the cache, all the experiments were executed in a cold-start mode e.g., shutting down the database management system and starting it again before the experiment, versus computation of a workload twice without shutting down the database management system between the runs. Although large machines were used with ample memory, the cache had no significant effect on the retrieval time. This result is most likely due to the very large workloads and the large-scale computations. Each set of computations fills-in the memory with new data, so the cache cannot be utilized to speedup computations.

It was observed that an existence of LoS affected the running time, because when there is no LoS the computations were permitted to terminate early. There were two steps to the computation. One step involved a retrieval of the bins. As expected, the bin-retrieval time (the time it takes to discover the relevant bins and retrieve them from the database) was not affected by the existence or lack of LoS. However, after bin retrieval, the running time was significantly affected by the existence or lack of LoS, due to the early termination in the case where there is no LoS.

In the interest of efficiency, the 3$^{rd}$ example min-sum computation algorithm was implemented in C using shared libraries. Accordingly, in this algorithm retrieval time was not distinguished from computation time. A total running time for this algorithm for NYC and Nationwide workloads was obtained. Since selection and retrieval of the bins was inseparable, the effect of the existence or lack of LoS was diminished. In particular, local computations were observed to be much faster than the nationwide computations. Overall, in a local workload fewer shared objects were retrieved and processed, even for short distances, because many LoS computations were conducted over overlapping areas. In practice, planning is often executed over a restricted area, and a local workload of 5000 pairs with an average distance of 10 miles between towers takes about $(5000\times0.125)/60\approx10$ minutes. The computation times reported herein were those times obtained with particular equipment available at that time. It is understood that computation times may vary according to different equipment as may be used.

Disclosed herein are systems, processes and non-transitory, machine-readable media adapted for wireless backhaul planning. The illustrative techniques have been developed with a goal to be more accurate and faster than alternative existing systems. In an initial version of the system, there were scripts that selected and uploaded the necessary data into the database, per workload, and another script executed the computations in a naive way. In that approach, the pre-processing for about 5000 pairs was about two weeks and the computation after the pre-processing took between 40 to 60 minutes. The current system computes a workload of 5000 pairs in about 10 minutes altogether. This refers to all the steps, including bin selection and retrieval from the database. This is done while coping with a more challenging task (3D Fresnel zone computation instead of 2D Fresnel zone and more accurate distance computation).

It can be appreciated that coping with long distances between towers is challenging. There is a twofold increase in the number of bins as a function of the distance, because there are more bins between the towers but also the radius of the Fresnel zone increases. Thus, effective retrieval of bins from the database with proper optimizations is essential for efficient overall computation.

It has been observed that practicing the techniques disclosed herein affords a substantial reduction in computation time as a result of the various optimization techniques. For example, computation efficiency may result from data inserted into a database with clustered indexes and according to a compact representation. Computation efficiency may be further improved by retrieval of bins from a database in an optimized manner using a suitable bounding buffer and an index, e.g., retrieving the minimal number of bins necessary per each computation. This may be accomplished by computing a tight buffer around a projection of the Fresnel zone on a map of the terrain, e.g., the earth and retrieving only bins that are below the Fresnel zone and relevant for the computation. In at least some embodiments, the computation may be multithreaded, using efficient algorithms that permit early termination, as disclosed herein.

Figure 3:
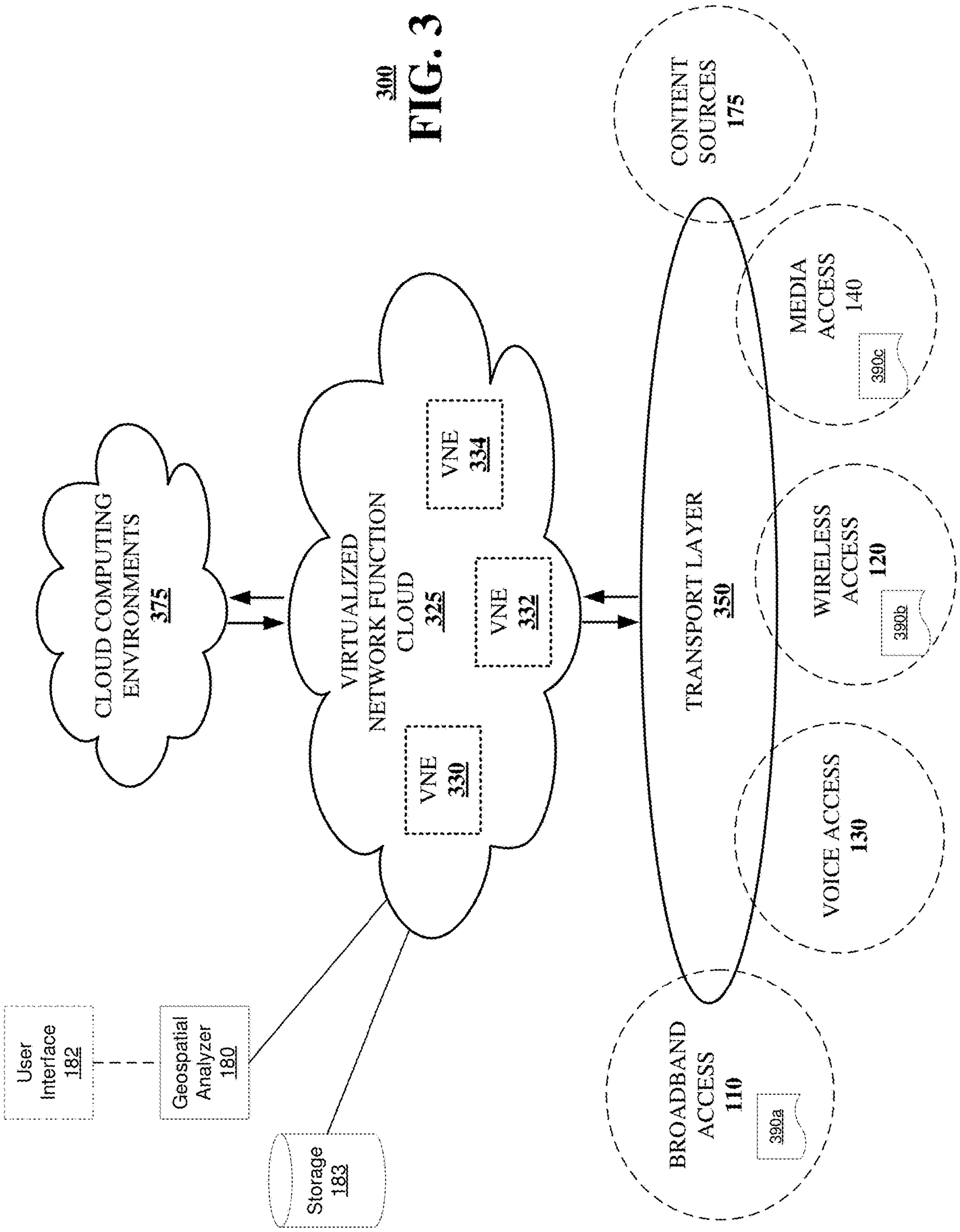
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of LoS analyzer system 200, and process 280 presented in FIGS. 1, 2A-2Q, and 3. For example, virtualized communication network 300 can facilitate in whole or in part efficient testing LoS links for clearance of Fresnel zones to identify solutions that optimize antenna heights.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers, and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

In at least some embodiments, the virtualized communication network 300 includes a geospatial analyzer 180 adapted to analyze LoS backhaul links according to the techniques disclosed herein based on antenna tower locations, antenna height ranges and geospatial data. The communication system may include a geospatial data storage system 183, such as a database management system. The geospatial data storage system 183 may store geospatial data including one or more of terrain elevations, descriptive and/or heights of natural and/or artificial structures overlaying a geospatial grid. The geospatial data storage system 183 may store antenna mounting structure location, such as tower locations, types, heights, owners, and information regarding other antennas as may already be installed on the towers. In at least some embodiments, the communication system 100 may include a user interface 182 adapted to facilitate user interaction with the geospatial analyzer, e.g., accepting user input identifying backhaul links, such as endpoints, intermediate points, tower locations, frequency bands of operation, and the like. The user interface 182 may include a graphical interface portion adapted to display graphical information, such as maps, tower locations, LoS links, Fresnel zones, 3D grid information, and analysis results. One or more of the geospatial analyzer 180, the geospatial data storage system 183 and the user interface 182 may be implemented in whole or in part according to the virtualized network function cloud 325, according to the cloud computing environment 375. One or more of the broadband access 110, wireless access 120, media access 140 may include a Geospatial analyzer client 390*a*, 390*b*, 390*c* adapted to facilitate LoS link analysis in cooperation with the geospatial analyzer 180 according to a client-server architecture.

Figure 4:
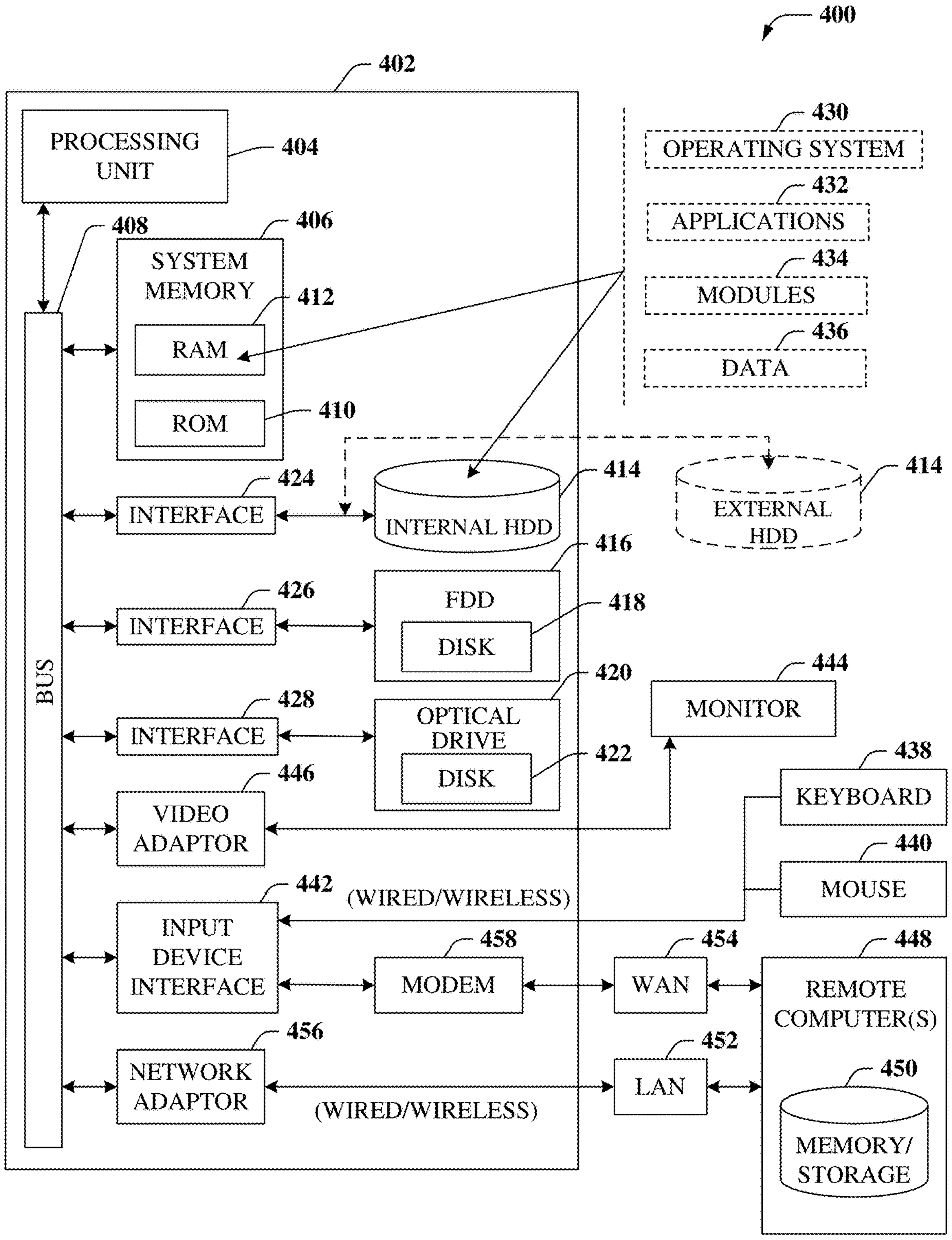
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, the LOS analyzer system 200, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part efficient testing LoS links for clearance of Fresnel zones to identify solutions that optimize antenna heights.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
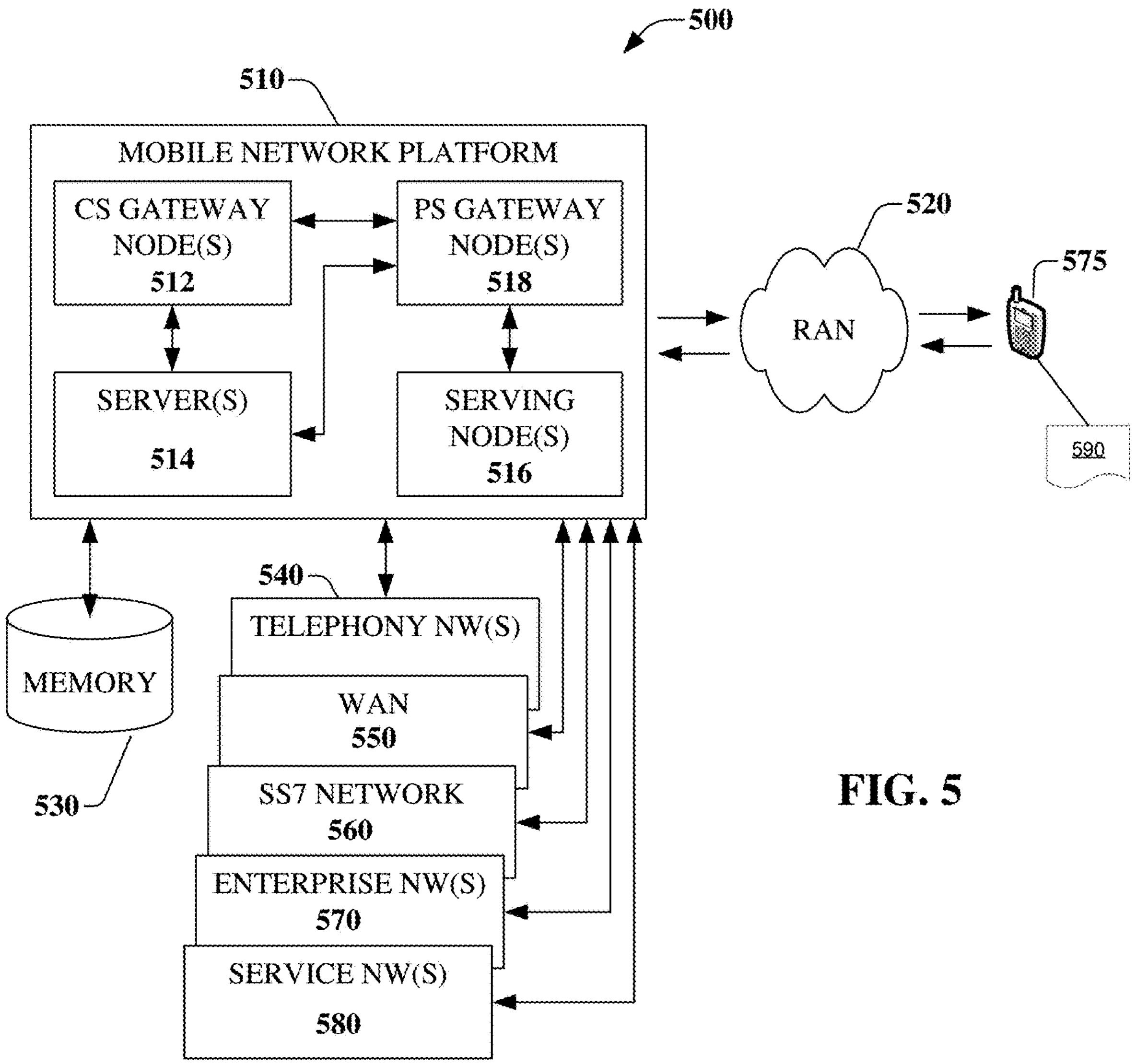
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, the LOS analyzer system 200, a user interface 207, a client device of a client-server embodiment of the LOS analyzer system 200, and/or VNEs 330, 332, 334, etc. For example, platform 510 can facilitate in whole or in part efficient testing LoS links for clearance of Fresnel zones to identify solutions that optimize antenna heights. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575. In at least some embodiments, the radiotelephone 575 may include a Geospatial analyzer client 590, adapted to facilitate LoS link analysis in cooperation with the geospatial analyzer 180 (FIGS. 1 and 3) according to a client-server architecture.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
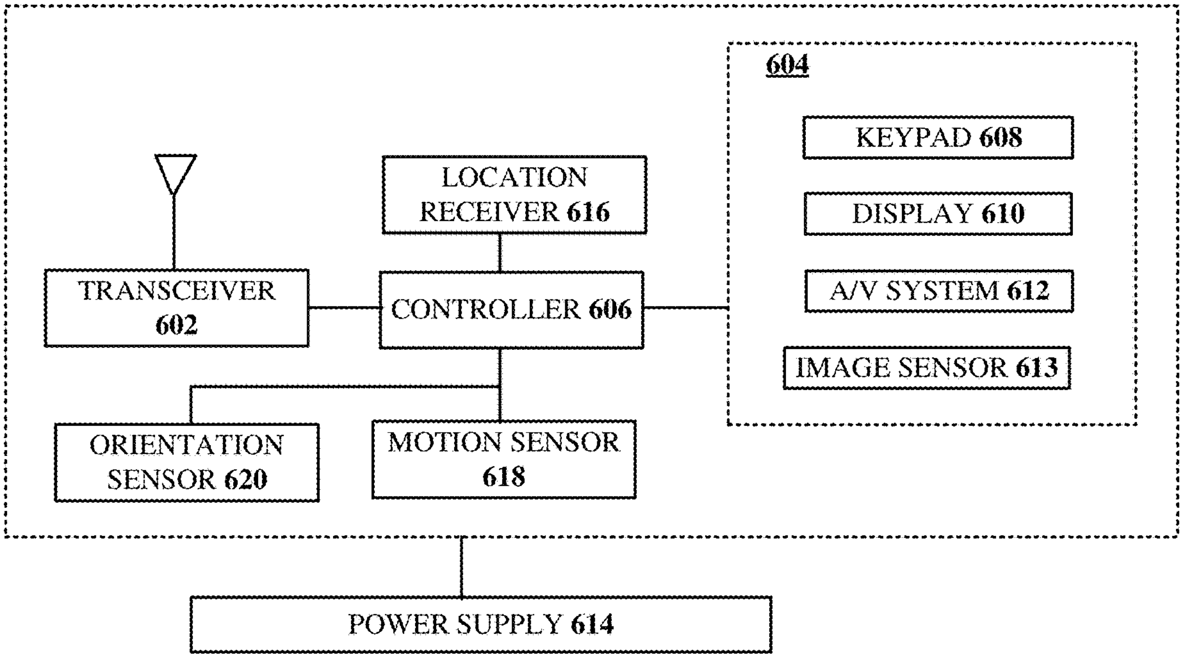
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part efficient testing LoS links for clearance of Fresnel zones to identify solutions that optimize antenna heights.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4, \ldots, x_n)$, to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature, or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

determining a line of sight (LoS) ray extending between a first antenna positioned within a first height region of a first tower and a second antenna positioned within a second height region of a second tower;

generating a set of constraint heights based on elevation profile data, the set of constraint heights located within a vertical plane containing the first tower and the second tower;

updating the LoS ray extending between the first antenna and the second antenna according to an LoS ray adjustment strategy to obtain a set of updated LoS rays;

identifying a subset of LoS rays of the set of updated LoS rays that do not intersect the set of constraint heights; and determining whether the subset of LoS rays of the set of updated LoS rays comprises a solution that comprises one or more of a fixed drain solution in which the LoS ray adjustment strategy minimizes a second antenna height within the second height region while a first antenna height is fixed within the first height region, a minimum-height solution in which the LoS ray adjustment strategy minimizes a maximum antenna height of the first antenna height within the first height region and the second antenna height within the second height region, and a minimum-sum solution in which the LoS ray adjustment strategy minimizes a sum of the first antenna height within the first height region and the second antenna height within the second height region.

2. The device of claim 1, wherein the LoS ray adjustment strategy further comprises:

varying in a single pass a first height of the first antenna within a first height region of the first tower to obtain first height variations, and wherein the updating of the LoS is according to the first height variations.

3. The device of claim 2, wherein the second antenna height remains constant at a fixed second antenna height within the second height region.

4. The device of claim 3, wherein the varying in the single pass of the first height of the first antenna further comprises determining a set of slopes between the fixed second antenna height and each of the constraint heights, wherein the first height variations are determined according to the fixed second antenna height and the set of slopes.

5. The device of claim 3, wherein the solution further comprises a minimum first antenna height of the subset of LoS rays of the set of updated LoS rays that do not intersect the set of constraint heights.

6. The device of claim 2, wherein the operations further comprise:

determining a slope of a line between a first minimum height of the first height region of the first tower and a second minimum height of the second height region of the second tower, wherein the first height variations preserve the slope of the line.

7. The device of claim 6, wherein the single pass increases a first height of the first antenna within the first height region and the second antenna height within the second height region uniformly until a first one of the first height of the first antenna reaches a first maximum height of the first height region of the first tower, or the second antenna height reaches a second maximum height of the second height region.

8. The device of claim 7, wherein the solution further comprises a minimum first antenna height of the subset of LoS rays of the set of updated LoS rays that do not intersect the set of constraint heights.

9. The device of claim 7, wherein the operations further comprise:

tilting the slope of the line responsive to the first one of the first height of the first antenna reaching the first maximum height of the first height region of the first tower, or the second antenna height reaching the second maximum height of the second height region, to obtain a tilted slope.

10. The device of claim 9, wherein the solution comprises a minimum tilted slope of the set of updated LoS rays that do not intersect the set of constraint heights.

11. The device of claim 1, wherein the operations further comprise:

responsive to determining the subset of LoS rays comprises an empty set, generating a graphical representation that depicts the LoS rays between the first and second antennas and a set of 3D cells extending to respective heights above a horizontal plane determined according to the set of constraint heights, wherein presentation of the graphical representation facilitates manual analysis.

12. A method, comprising:

identifying, by a processing system including a processor, a line of sight (LoS) ray extending between a first antenna positioned within a first height region of a first tower and a second antenna positioned within a second height region of a second tower;

determining, by the processing system, a set of constraint heights based on elevation profile data, the set of constraint heights located within a vertical plane containing the first and second towers;

updating, by the processing system, the LoS ray extending between the first antenna and the second antenna according to an LoS adjustment criterion to obtain a set of updated LoS rays;

identifying, by the processing system, a subset of LoS rays of the set of updated LoS rays that do not intersect the set of adjusted constraint heights; and determining, by the processing system, whether the subset of LoS rays of the set of updated LoS rays comprises a solution, wherein the solution comprises one or more of a fixed drain solution in which the LoS adjustment criterion minimizes a second antenna height within the second height region while a first antenna height is fixed within the first height region, a minimum-height solution in which the LoS adjustment criterion minimizes a maximum antenna height of the first antenna height and the second antenna height within the first height region and the second height region, and a minimum-sum solution in which the LoS adjustment criterion minimizes a sum of the first antenna height and the second antenna height within the first height region and the second height region.

13. The method of claim 12, wherein the updating of the LoS ray extending between the first and second antennas further comprises:

varying, by the processing system, in a single pass, a first height of the first antenna within the first height region of the first tower to obtain first height variations, and wherein the second antenna height remains constant at a fixed second height within the second height region.

14. The method of claim 13, wherein the varying in the single pass of the first height of the first antenna further comprises determining a set of slopes between the fixed second height and each of the adjusted constraint heights, and wherein the first height variations are determined according to the fixed second height and the set of slopes.

15. The method of claim 12, further comprising:

determining, by the processing system, a Fresnel zone about the LoS ray extending between the first and second antennas;

projecting, by the processing system, the Fresnel zone onto a geospatial grid to obtain a Fresnel zone projection, wherein the geospatial grid comprises three-dimensional (3D) cells, each 3D cell having a height above a horizontal plane;

selecting, by the processing system, cells of the geospatial grid that intersect a projection of the Fresnel zone upon the horizontal plane to obtain a set of 3D cells; and responsive to the subset of LoS rays of the set of updated LoS rays comprising an empty set, generating, by the processing system, a graphical representation that depicts the subset of LoS rays of the set of updated LoS rays and the set of 3D cells, wherein presentation of the graphical representation facilitates manual analysis.

16. The method of claim 15, wherein the graphical representation graphically distinguishes 3D cells of the set of 3D cells having adjusted constraint heights that intersect the LoS ray between the first antenna and the second antenna.

17. A non-transitory, machine-readable medium, comprising executable instructions that, when executed by a processing system including a processor, facilitate performance of operations, the operations comprising:

determining a line of sight (LoS) ray between first and second antennas, wherein the first and second antennas are positioned within first and second height regions upon first and second antenna mounts at first and second geospatial locations;

determining a set of constraint heights according to heights of a set of three-dimensional (3D) cells having respective heights above a horizontal plane, the set of constraint heights located within a vertical plane containing the first and second antenna mounts;

revising the LoS ray between the first and second antennas according to an LoS adjustment algorithm to obtain a set of revised LoS rays;

identifying a subset of LoS rays of the set of revised LoS rays that do not intersect the set of adjusted constraint heights; and determining whether the subset of LoS rays of the set of revised LoS rays comprises a solution, wherein the solution comprises one or more of a fixed drain solution in which the LoS adjustment algorithm minimizes a second antenna height within the second height region while a first antenna height is fixed within the first height region, a minimum-height solution in which the LoS adjustment algorithm minimizes a maximum antenna height of the first antenna height and the second antenna height within the first height region and the second height region, and a minimum-sum solution in which the LoS adjustment algorithm minimizes a sum of the first antenna height and the second antenna height within the first height region and the second height region.

18. The non-transitory, machine-readable medium of claim 17, wherein the revising of the LoS between the first and second antennas further comprises:

varying in a single pass, a first height of the first antenna within the first height region of one of the first and second antenna mounts to obtain first height variations, and wherein a second height of the second antenna remains constant at a fixed second height within the second height region.

19. The non-transitory, machine-readable medium of claim 17, further comprising:

responsive to determining the subset of LoS rays of the set of revised LoS rays comprises an empty set, generating a graphical representation depicting the LoS ray between the first and second antennas and the set of 3D cells, wherein presentation of the graphical representation facilitates manual analysis.

20. The non-transitory, machine-readable medium of claim 17, wherein a graphical representation graphically distinguishes 3D cells of the set of 3D cells having adjusted constraint heights that intersect the LoS between the first and second antennas.

* * * * *